US012585774B2

(12) United States Patent
Funk

(10) Patent No.: US 12,585,774 B2
(45) Date of Patent: *Mar. 24, 2026

(54) SYSTEM AND METHOD FOR IMPLEMENTING ADDED SERVICES FOR OBD2 SMART VEHICLE CONNECTION

(71) Applicant: CenturyLink Intellectual Property LLC, Denver, CO (US)

(72) Inventor: Tom Funk, Littleton, CO (US)

(73) Assignee: Centurylink Intellectual Property LLC, Denver, CO (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/666,534

(22) Filed: May 16, 2024

(65) Prior Publication Data

US 2024/0303337 A1     Sep. 12, 2024

Related U.S. Application Data

(63) Continuation of application No. 17/969,438, filed on Oct. 19, 2022, now Pat. No. 11,989,295, which is a
(Continued)

(51) Int. Cl.
    *G06F 21/56*         (2013.01)
    *G06F 21/85*         (2013.01)
    (Continued)

(52) U.S. Cl.
    CPC .......... *G06F 21/566* (2013.01); *G06F 21/568* (2013.01); *G06F 21/85* (2013.01);
    (Continued)

(58) Field of Classification Search
    CPC ...... G06F 21/566; G06F 21/568; G06F 21/85; G07C 5/008; G07C 5/0808; G07C 5/0816;
    (Continued)

(56) References Cited

U.S. PATENT DOCUMENTS

| 2,754,101 A | 7/1956 | Haworth et al. |
| 4,034,567 A | 7/1977 | Roggen |

(Continued)

FOREIGN PATENT DOCUMENTS

| CA | 2337284 | 8/2002 |
| CN | 101799987 B | 11/2011 |

(Continued)

OTHER PUBLICATIONS

Abram, et al.; Center for Nondestructive Evaluation, Iowa State University, Ames, IA, USA; "Effect of relative humidity on the curing and dielectric properties of polyurethane-based composites"; 2005 Annual Report Conference . . . Phenomena; 4 pages.
(Continued)

*Primary Examiner* — Brodie J Follman

(57) ABSTRACT

Directed to implementing Internet of Things ("IoT") functionality, and, in particular embodiments, implementing added services for OBD2 connection for IoT-capable vehicles. In various embodiments, a portable device (when connected to an OBD2 DLC port of a vehicle) might monitor wireless communications between a vehicle computing system(s) and an external device(s), might monitor vehicle sensor data from vehicular sensors tracking operational conditions of the vehicle, and might monitor operator input sensor data from operator input sensors tracking input by a vehicle operator. The portable device (or a server) might analyze either the monitored wireless communications or a combination of the monitored vehicle sensor data and the monitored operator input sensor data, to determine whether vehicle operation has been compromised. If so, the portable device (or the server) might alert the operator of the vehicle via a user interface and might initiate one or more remediation operations.

16 Claims, 9 Drawing Sheets

Related U.S. Application Data continuation of application No. 17/561,386, filed on Dec. 23, 2021, now Pat. No. 11,941,120, which is a continuation of application No. 16/372,061, filed on Apr. 1, 2019, now Pat. No. 11,232,203, which is a continuation of application No. 15/390,078, filed on Dec. 23, 2016, now Pat. No. 10,249,103.

(60) Provisional application No. 62/370,124, filed on Aug. 2, 2016.

(51) Int. Cl.

| | |
|---|---|
| *G07C 5/00* | (2006.01) |
| *G07C 5/08* | (2006.01) |
| *H04L 9/40* | (2022.01) |
| *H04W 12/122* | (2021.01) |
| *H04W 12/128* | (2021.01) |
| *H04W 24/08* | (2009.01) |
| *H04W 76/30* | (2018.01) |
| *H04L 67/12* | (2022.01) |
| *H04W 4/70* | (2018.01) |

(52) U.S. Cl.
CPC ........... *G07C 5/008* (2013.01); *G07C 5/0808* (2013.01); *G07C 5/0816* (2013.01); *H04L 63/1416* (2013.01); *H04W 12/122* (2021.01); *H04W 12/128* (2021.01); *H04W 24/08* (2013.01); *H04W 76/30* (2018.02); *H04L 67/12* (2013.01); *H04W 4/70* (2018.02)

(58) Field of Classification Search
CPC .. H04L 63/1416; H04L 67/12; H04W 12/122; H04W 12/128; H04W 24/08; H04W 76/30; H04W 4/70
See application file for complete search history.

(56) References Cited

U.S. PATENT DOCUMENTS

| | | | |
|---|---|---|---|
| 4,329,083 A | 5/1982 | Parkinson | |
| 4,620,317 A | 10/1986 | Anderson | |
| 4,815,814 A | 3/1989 | Ulijasz | |
| 4,940,359 A | 7/1990 | Van Duyn et al. | |
| 5,239,129 A | 8/1993 | Ehrenfels | |
| 5,313,546 A | 5/1994 | Toffetti | |
| 5,528,684 A | 6/1996 | Schneider et al. | |
| 5,566,622 A | 10/1996 | Ziaylek, Jr. et al. | |
| 5,583,492 A | 12/1996 | Nakanishi | |
| 5,606,606 A | 2/1997 | Schneider et al. | |
| 5,717,955 A | 2/1998 | Swinehart | |
| 5,760,706 A | 6/1998 | Kiss | |
| 5,879,109 A | 3/1999 | Diermeier et al. | |
| 6,099,080 A | 8/2000 | Hirashita et al. | |
| 6,125,291 A | 9/2000 | Miesel | |
| 6,272,346 B1 | 8/2001 | Fujinami | |
| 6,371,691 B1 | 4/2002 | Finzel et al. | |
| 6,414,605 B1 | 7/2002 | Walden | |
| 6,499,410 B1 | 12/2002 | Berardi | |
| 6,503,025 B1 | 1/2003 | Miller | |
| 6,792,319 B1 | 9/2004 | Bilger | |
| 6,807,355 B2 | 10/2004 | Dofher | |
| 6,829,424 B1 | 12/2004 | Finzel et al. | |
| 6,866,448 B2 | 3/2005 | Finzel et al. | |
| 6,990,192 B1 | 1/2006 | Denovich et al. | |
| 7,030,781 B2 | 4/2006 | Jones | |
| 7,050,683 B2 | 5/2006 | Dofher | |
| 7,095,930 B2 | 8/2006 | Storaasli et al. | |
| 7,096,003 B2 | 8/2006 | Joao | |
| 7,397,363 B2 | 7/2008 | Joao | |
| 7,514,628 B2 | 4/2009 | Kadrnoska et al. | |
| 7,522,805 B2 | 4/2009 | Smith et al. | |
| 7,674,980 B2 | 3/2010 | Lubanski | |
| 7,739,030 B2 | 6/2010 | Desai | |
| 7,740,417 B2 | 6/2010 | Jang | |
| 7,849,886 B2 | 12/2010 | Carew et al. | |
| D640,290 S | 6/2011 | Stellman et al. | |
| 8,000,314 B2 | 8/2011 | Brownrigg | |
| 8,061,344 B2 | 11/2011 | Dofher | |
| 8,296,383 B2 | 10/2012 | Lindahl | |
| 8,380,652 B1 | 2/2013 | Francis, Jr. | |
| 8,480,332 B2 | 7/2013 | Miller et al. | |
| 8,654,936 B1 | 2/2014 | Eslambolchi et al. | |
| 8,787,246 B2 | 7/2014 | Brownrigg | |
| 8,811,887 B2 | 8/2014 | Dottling et al. | |
| 8,976,704 B2 | 3/2015 | Morper | |
| 9,062,423 B2 | 6/2015 | Allouche et al. | |
| 9,210,583 B2 | 12/2015 | Henderson | |
| 9,226,418 B2 | 12/2015 | Magno et al. | |
| 9,270,098 B2 | 2/2016 | Isaaks et al. | |
| 9,298,410 B2 | 3/2016 | Juchem | |
| 9,326,297 B1 | 4/2016 | Farkas | |
| 9,432,340 B1 | 8/2016 | Tutt et al. | |
| 9,456,276 B1 | 9/2016 | Chhetri | |
| 9,466,966 B2 | 10/2016 | Allouche et al. | |
| 9,531,174 B2 | 12/2016 | Elford et al. | |
| 9,536,425 B1 | 1/2017 | Soltesz | |
| 9,588,315 B1 | 3/2017 | Turner | |
| 9,703,955 B2 | 7/2017 | Yan | |
| 9,742,172 B2 | 8/2017 | Elford et al. | |
| 9,780,433 B2 | 10/2017 | Schwengler et al. | |
| 9,786,997 B2 | 10/2017 | Schwengler et al. | |
| 9,832,655 B2 | 11/2017 | Horneman | |
| 9,840,212 B2 | 12/2017 | Ben Noon | |
| 9,860,677 B1 | 1/2018 | Agerstam | |
| 9,860,812 B2 | 1/2018 | Tipton | |
| 9,866,542 B2 | 1/2018 | Baltes | |
| 9,867,057 B2 | 1/2018 | Yu | |
| 9,867,112 B1 | 1/2018 | Schwengler | |
| 9,917,903 B2 | 3/2018 | Clernon | |
| 10,069,751 B2 | 9/2018 | Amulothu | |
| 2001/0029311 A1 | 10/2001 | Khare | |
| 2002/0024450 A1 | 2/2002 | Townsend | |
| 2002/0057945 A1 | 5/2002 | Dahowski | |
| 2002/0061231 A1 | 5/2002 | Finzel et al. | |
| 2003/0061029 A1 | 3/2003 | Shaket | |
| 2003/0123935 A1 | 7/2003 | Dofher | |
| 2003/0210958 A1 | 11/2003 | Nothofer | |
| 2004/0083054 A1 | 4/2004 | Jones | |
| 2004/0091313 A1 | 5/2004 | Zhou | |
| 2004/0113773 A1 | 6/2004 | Nieters | |
| 2004/0115004 A1 | 6/2004 | Serrano | |
| 2004/0129445 A1 | 7/2004 | Winkelbach | |
| 2004/0142658 A1 | 7/2004 | McKenna | |
| 2004/0160319 A1 | 8/2004 | Joao | |
| 2004/0221324 A1 | 11/2004 | Ansari et al. | |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0207711 A1 | 9/2005 | Vo | |
| 2005/0248444 A1 | 11/2005 | Joao | |
| 2005/0259930 A1 | 11/2005 | Elkins et al. | |
| 2005/0285807 A1 | 12/2005 | Zehngut | |
| 2006/0008231 A1 | 1/2006 | Reagan | |
| 2006/0093303 A1 | 5/2006 | Reagan et al. | |
| 2006/0118338 A1 | 6/2006 | Maybury | |
| 2006/0204187 A1 | 9/2006 | Dofher | |
| 2007/0018849 A1 | 1/2007 | Salser, Jr. | |
| 2007/0048084 A1 | 3/2007 | Jung | |
| 2007/0079113 A1 | 4/2007 | Kulkarni et al. | |
| 2007/0087756 A1 | 4/2007 | Hoffberg | |
| 2007/0154152 A1 | 7/2007 | Morris | |
| 2007/0247794 A1 | 10/2007 | Jaffe | |
| 2008/0216367 A1 | 9/2008 | Van der Poel | |
| 2008/0234878 A1 | 9/2008 | Joao | |
| 2008/0256008 A1 | 10/2008 | Kwok | |
| 2008/0298755 A1 | 12/2008 | Caplan | |
| 2008/0303654 A1 | 12/2008 | Kates | |
| 2009/0121860 A1 | 5/2009 | Kimmel | |
| 2009/0125160 A1 | 5/2009 | Desai | |
| 2009/0177172 A1 | 7/2009 | Wilkes | |
| 2009/0214163 A1 | 8/2009 | Lu | |

(56) References Cited

U.S. PATENT DOCUMENTS

| | | |
|---|---|---|
| 2009/0317047 A1 | 12/2009 | Smith |
| 2009/0327910 A1 | 12/2009 | Black |
| 2010/0010117 A1 | 1/2010 | Bricout |
| 2010/0045484 A1 | 2/2010 | Brynielsson |
| 2010/0047021 A1 | 2/2010 | Scola |
| 2010/0071596 A1 | 3/2010 | Konczak |
| 2010/0086254 A1 | 4/2010 | Dofher |
| 2010/0124332 A1 | 5/2010 | Arena |
| 2010/0217604 A1 | 8/2010 | Baldwin et al. |
| 2010/0243096 A1 | 9/2010 | Berglund |
| 2010/0325421 A1 | 12/2010 | Park et al. |
| 2011/0016754 A1 | 1/2011 | Ruhl et al. |
| 2011/0052131 A1 | 3/2011 | Park et al. |
| 2011/0106321 A1 | 5/2011 | Cherian |
| 2011/0161076 A1 | 6/2011 | Davis |
| 2011/0288684 A1 | 11/2011 | Farlow |
| 2011/0315259 A1 | 12/2011 | Kelly |
| 2012/0048148 A1 | 3/2012 | Konczak |
| 2012/0086563 A1 | 4/2012 | Arling |
| 2012/0195694 A1 | 8/2012 | Konczak |
| 2012/0249341 A1 | 10/2012 | Brown |
| 2012/0265370 A1 | 10/2012 | Kim |
| 2012/0268886 A1 | 10/2012 | Leontiev |
| 2012/0320766 A1 | 12/2012 | Sridhar |
| 2013/0009569 A1 | 1/2013 | Knibbe |
| 2013/0011198 A1 | 1/2013 | Pichler |
| 2013/0044918 A1 | 2/2013 | Nielsen et al. |
| 2013/0074067 A1 | 3/2013 | Chowdhry |
| 2013/0080898 A1 | 3/2013 | Lavian |
| 2013/0121761 A1 | 5/2013 | Dixon |
| 2013/0138424 A1 | 5/2013 | Koenig |
| 2013/0216187 A1 | 8/2013 | Dowling |
| 2013/0216313 A1 | 8/2013 | Gustavsson et al. |
| 2013/0217421 A1 | 8/2013 | Kim |
| 2013/0223807 A1 | 8/2013 | Elford et al. |
| 2013/0238326 A1 | 9/2013 | Kim et al. |
| 2013/0287500 A1 | 10/2013 | Miller |
| 2013/0294839 A1 | 11/2013 | Gustavsson et al. |
| 2013/0297199 A1 | 11/2013 | Kapp |
| 2014/0018969 A1 | 1/2014 | Forbes |
| 2014/0033288 A1 | 1/2014 | Wynn |
| 2014/0146905 A1 | 5/2014 | Zavadsky |
| 2014/0162629 A1 | 6/2014 | Tipton |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0202571 A1 | 7/2014 | Spijker |
| 2014/0233412 A1 | 8/2014 | Mishra |
| 2014/0270971 A1 | 9/2014 | Allouche et al. |
| 2014/0275852 A1 | 9/2014 | Hong |
| 2014/0327583 A1 | 11/2014 | Sparks |
| 2014/0343950 A1 | 11/2014 | Simpson et al. |
| 2014/0369336 A1 | 12/2014 | Prakash |
| 2015/0035704 A1 | 2/2015 | Schwengler et al. |
| 2015/0070221 A1 | 3/2015 | Schwengler et al. |
| 2015/0092744 A1 | 4/2015 | Singh |
| 2015/0098385 A1 | 4/2015 | Navalekar |
| 2015/0110453 A1 | 4/2015 | Elford et al. |
| 2015/0111589 A1 | 4/2015 | Yavuz |
| 2015/0120502 A1 | 4/2015 | Jung et al. |
| 2015/0124622 A1 | 5/2015 | Kovvali |
| 2015/0139598 A1 | 5/2015 | Barnes et al. |
| 2015/0230008 A1 | 8/2015 | Elford et al. |
| 2015/0249672 A1 | 9/2015 | Burns et al. |
| 2015/0262102 A1 | 9/2015 | Tann |
| 2015/0288161 A1 | 10/2015 | Allouche et al. |
| 2015/0298654 A1 | 10/2015 | Joao |
| 2015/0300527 A1 | 10/2015 | Konczak |
| 2015/0350247 A1 | 12/2015 | Adler et al. |
| 2015/0365278 A1 | 12/2015 | Chakrabarti et al. |
| 2016/0006837 A1 | 1/2016 | Reynolds |
| 2016/0021127 A1* | 1/2016 | Yan et al. ............. G06F 21/554 |
| 2016/0029346 A1 | 1/2016 | Suresh et al. |
| 2016/0063857 A1 | 3/2016 | Fowe |
| 2016/0064829 A1 | 3/2016 | Schaepperle |
| 2016/0080322 A1 | 3/2016 | Prisser |
| 2016/0085594 A1 | 3/2016 | Wang |
| 2016/0109036 A1 | 4/2016 | Elford et al. |
| 2016/0109678 A1 | 4/2016 | Schwengler et al. |
| 2016/0112779 A1 | 4/2016 | Barnett et al. |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226231 A1 | 8/2016 | Elford et al. |
| 2016/0226674 A1 | 8/2016 | Kangshang et al. |
| 2016/0248746 A1 | 8/2016 | James |
| 2016/0277310 A1 | 9/2016 | Challa |
| 2016/0294828 A1 | 10/2016 | Zakaria |
| 2016/0295364 A1 | 10/2016 | Zakaria |
| 2016/0323271 A1 | 11/2016 | Hinman |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0026607 A1 | 1/2017 | Kim |
| 2017/0059802 A1 | 3/2017 | Elford et al. |
| 2017/0060369 A1 | 3/2017 | Goyal |
| 2017/0085437 A1 | 3/2017 | Condeixa et al. |
| 2017/0093866 A1* | 3/2017 | Ben-Noon et al. ..... G06F 21/35 |
| 2017/0110784 A1 | 4/2017 | Vermes et al. |
| 2017/0118687 A1 | 4/2017 | Tipton |
| 2017/0134937 A1 | 5/2017 | Miller |
| 2017/0141575 A1 | 5/2017 | Fulton |
| 2017/0150299 A1 | 5/2017 | Coutinho et al. |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0195891 A1 | 7/2017 | Smith et al. |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1 | 8/2017 | Arsenault |
| 2017/0253258 A1 | 9/2017 | Bramucci |
| 2017/0279620 A1* | 9/2017 | Kravitz et al. ........ H04L 9/3268 |
| 2017/0300953 A1 | 10/2017 | Kim |
| 2017/0317482 A1 | 11/2017 | Elford et al. |
| 2017/0345295 A1 | 11/2017 | Mattar |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0113450 A1 | 4/2018 | Sherony |
| 2018/0122506 A1 | 5/2018 | Grantcharov |
| 2018/0136424 A1 | 5/2018 | Elford |
| 2018/0146412 A1 | 5/2018 | Schwengler |
| 2018/0168464 A1 | 6/2018 | Barnett, Jr. et al. |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |
| 2018/0295405 A1 | 10/2018 | Barnett, Jr. et al. |
| 2019/0028134 A1 | 1/2019 | Barnett, Jr. |
| 2019/0028951 A1 | 1/2019 | Schwengler et al. |
| 2019/0236858 A1 | 8/2019 | Funk |
| 2022/0129553 A1 | 4/2022 | Funk |
| 2023/0090728 A1 | 3/2023 | Funk |

(56)            References Cited

U.S. PATENT DOCUMENTS

FOREIGN PATENT DOCUMENTS

| FR | 2750717 | 1/1998 |
| GB | 2327680 | 2/1999 |
| JP | H03139705 | 6/1991 |
| KR | 10-2015-0128346 | 11/2015 |
| WO | WO-2010140507 | 5/1998 |
| WO | WO-199961710 | 12/1999 |
| WO | WO-200229947 | 4/2002 |
| WO | WO-2009098676 | 8/2009 |
| WO | WO-2013058648 | 4/2013 |
| WO | WO-2013130644 | 9/2013 |
| WO | WO-2014151726 | 9/2014 |
| WO | WO-2017123392 | 7/2017 |

OTHER PUBLICATIONS

European Patent Application No. 14768062.3; Extended European Search Report dated Oct. 18, 2016; 5 pages.
International Preliminary Report on Patentability, dated Jul. 17, 2018, Int'l Appl. No. PCT/US16/067938, Int'l Filing Date Dec. 21, 2016, 8 pgs.
International Preliminary Report on Patentability, dated Nov. 27, 2018, Int'l Appl. No. PCT/US17/034531, Int'l Filing Date May 25, 2017; 15 pgs.
International Search Report and Written Opinion prepared by the Korean Intellectual Property Office as International Searching Authority for PCT Intl Patent App. No. PCT/US2016/067938 dated Mar. 31, 2017; 11 pages.
International Search Report and Written Opinion prepared by the Korean Intellectual Property Office as Internationalo Searching Authority for PCT International Patent Application No. PCT/US2017/034531 mailed Aug. 29, 2017; 18 pages.
International Search Report and Written Opinion prepared by the U.S. Patent and Trademark Office as International Search Authority in PCT International Patent Application No. PCT/US2014/026325, mailed Aug. 8, 2014; 12 pages.
International Search Report and Written Opinion prepared by the U.S. Patent and Trademark Office as International Searching Authority for PCT International Patent Application No. PCT/US2013/0280 mailed May 3, 2013; 20 pages.
Lejun Qi, Linnea Petersson & Tieliang Liu (2014) "Review of Recent Activities on Dielectric Films for Capacitor Applications," Journal of International Council on Electrical Engineering, 4:1, 1-6, DOI: 10.5370/JICEE.2014.4.1.001.
PCT International Patent Application No. PCT/US2014/026325, International Preliminary Report on Patentability issued Sep. 15, 2015; 8 pages.
Preliminary Report on Patentability for PCT International Patent Application No. PCT/US2013/0280 mailed Sep. 12, 2014; 13 pages.
Alexander, Chris et al., "Improved User Authentication in Off-The-Record Messaging", 2009 , 7 pgs.
Bersch, Christian et al., "Bimanual Robotic Cloth Manipulation for Laundry Folding", 2011 , 7 pgs.
Borisov, Nikita et al., "Off-the-Record Communication, or, Why Not to Use PGP", 2004 , 8 pgs.
De Raimondo, Mario et al., "Secure Off-the-Record Messaging", 2005 , 9 pgs.
Goldberg, Ian et al., "Multi-party Off-the-Record Messaging", 2007 , 11 pgs.
Stedman, Ryan et al., "A User Study of Off-the-Record Messaging", 2008 , pp. 1-10.

* cited by examiner

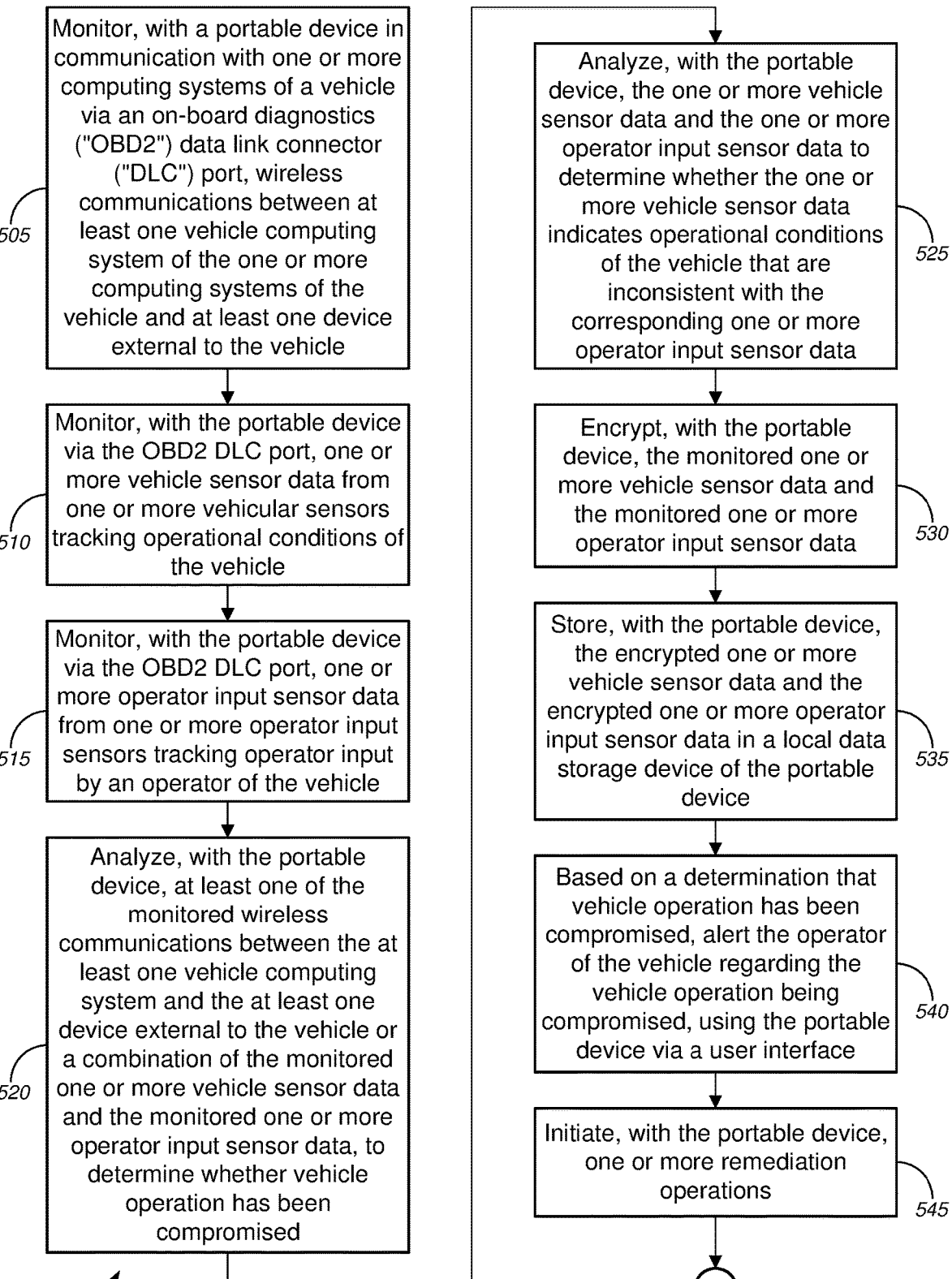

505 — Monitor, with a portable device in communication with one or more computing systems of a vehicle via an on-board diagnostics ("OBD2") data link connector ("DLC") port, wireless communications between at least one vehicle computing system of the one or more computing systems of the vehicle and at least one device external to the vehicle 510 — Monitor, with the portable device via the OBD2 DLC port, one or more vehicle sensor data from one or more vehicular sensors tracking operational conditions of the vehicle 515 — Monitor, with the portable device via the OBD2 DLC port, one or more operator input sensor data from one or more operator input sensors tracking operator input by an operator of the vehicle 520 — Analyze, with the portable device, at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised 525 — Analyze, with the portable device, the one or more vehicle sensor data and the one or more operator input sensor data to determine whether the one or more vehicle sensor data indicates operational conditions of the vehicle that are inconsistent with the corresponding one or more operator input sensor data 530 — Encrypt, with the portable device, the monitored one or more vehicle sensor data and the monitored one or more operator input sensor data 535 — Store, with the portable device, the encrypted one or more vehicle sensor data and the encrypted one or more operator input sensor data in a local data storage device of the portable device 540 — Based on a determination that vehicle operation has been compromised, alert the operator of the vehicle regarding the vehicle operation being compromised, using the portable device via a user interface 545 — Initiate, with the portable device, one or more remediation operations

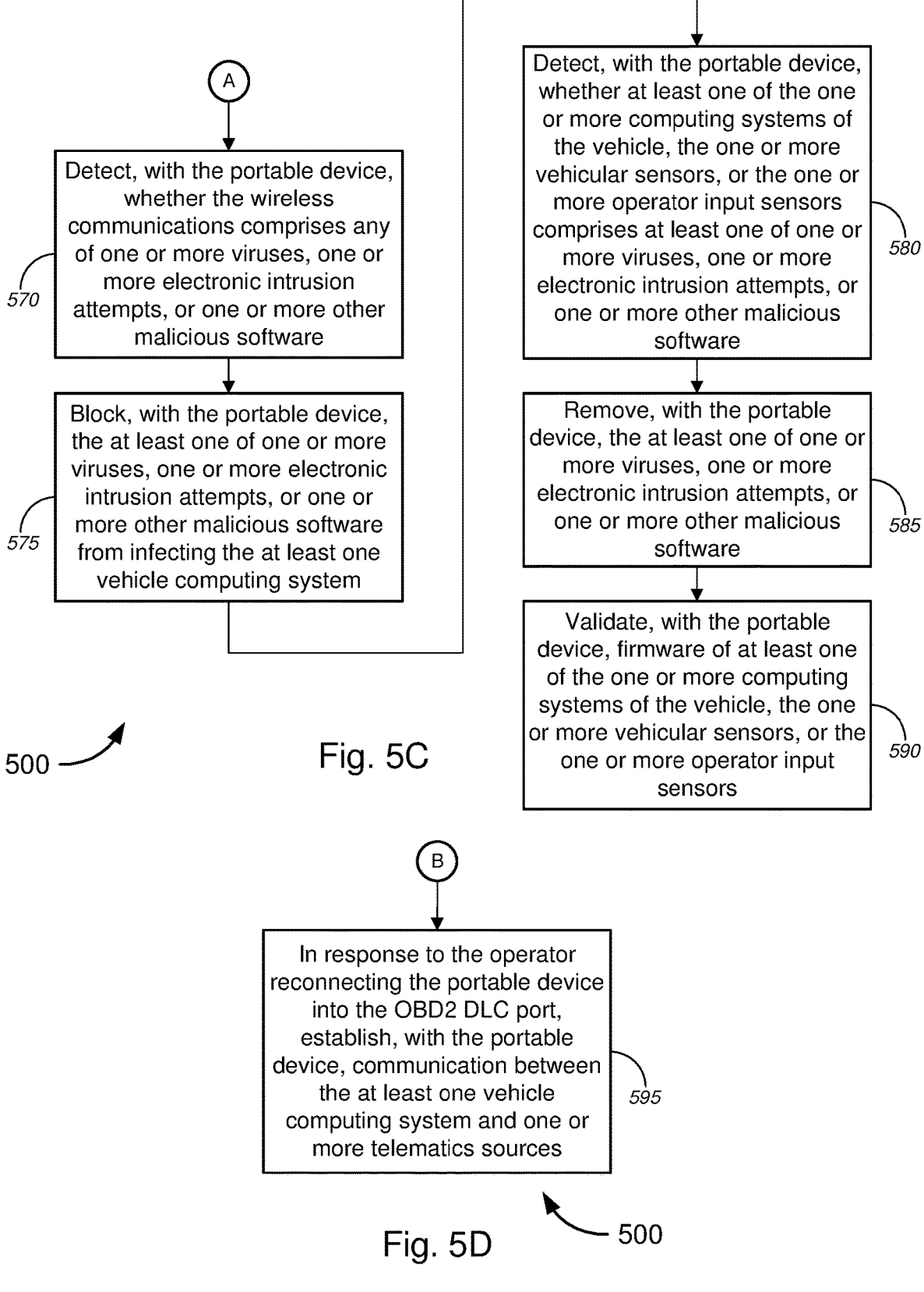

(A)

Detect, with the portable device, whether the wireless communications comprises any of one or more viruses, one or more electronic intrusion attempts, or one or more other malicious software

570

Block, with the portable device, the at least one of one or more viruses, one or more electronic intrusion attempts, or one or more other malicious software from infecting the at least one vehicle computing system

575

Detect, with the portable device, whether at least one of the one or more computing systems of the vehicle, the one or more vehicular sensors, or the one or more operator input sensors comprises at least one of one or more viruses, one or more electronic intrusion attempts, or one or more other malicious software

580

Remove, with the portable device, the at least one of one or more viruses, one or more electronic intrusion attempts, or one or more other malicious software

585

Validate, with the portable device, firmware of at least one of the one or more computing systems of the vehicle, the one or more vehicular sensors, or the one or more operator input sensors

In response to the operator reconnecting the portable device into the OBD2 DLC port, establish, with the portable device, communication between the at least one vehicle computing system and one or more telematics sources

SYSTEM AND METHOD FOR IMPLEMENTING ADDED SERVICES FOR OBD2 SMART VEHICLE CONNECTION

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things ("IoT") functionality, and, in particular embodiments, to methods, systems, apparatus, and computer software for implementing added services for OBD2 connection for IoT-capable vehicles.

BACKGROUND

As vehicles become more connected with other devices and systems (e.g., due to proliferation of Internet of Things ("IoT") functionality, due to adding non-IoT wireless communications capabilities to the vehicles, and/or the like), these so-called "smart vehicles" become susceptible to external influence (such as hackers attempting intrusion into the vehicle systems, hackers planting viruses or other malicious software ("malware") that infect the vehicle systems, or malware-infected devices (perhaps even associated with the operator of the vehicle or passengers therein) being "innocently" connected to the vehicle systems thereby infecting them, and/or the like). Further due to modern vehicles operating by "fly-by-wire" systems (i.e., using electronic connections, rather than mechanical linkages, between the control systems of the vehicle (e.g., accelerator pedal, brake pedal, steering wheel, and/or the like) and the corresponding operational systems of the vehicle (e.g., engine or throttle valve, brakes, variable power assist system, and/or the like), in conjunction with the potential security issues that exist with wireless communications, it becomes possible for third parties to remotely control the vehicle or otherwise detrimentally affect the operation of the vehicle. Currently, there do not appear to be systems in place to remedy such occurrences, much less systems or methods that provide added services via OBD2 connection to remedy such occurrences.

Hence, there is a need for more robust and scalable solutions for implementing communications for Internet of Things ("IoT") functionality, and, in particular embodiments, to methods, systems, apparatus, and computer software for implementing added services for OBD2 connection for IoT-capable vehicles.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
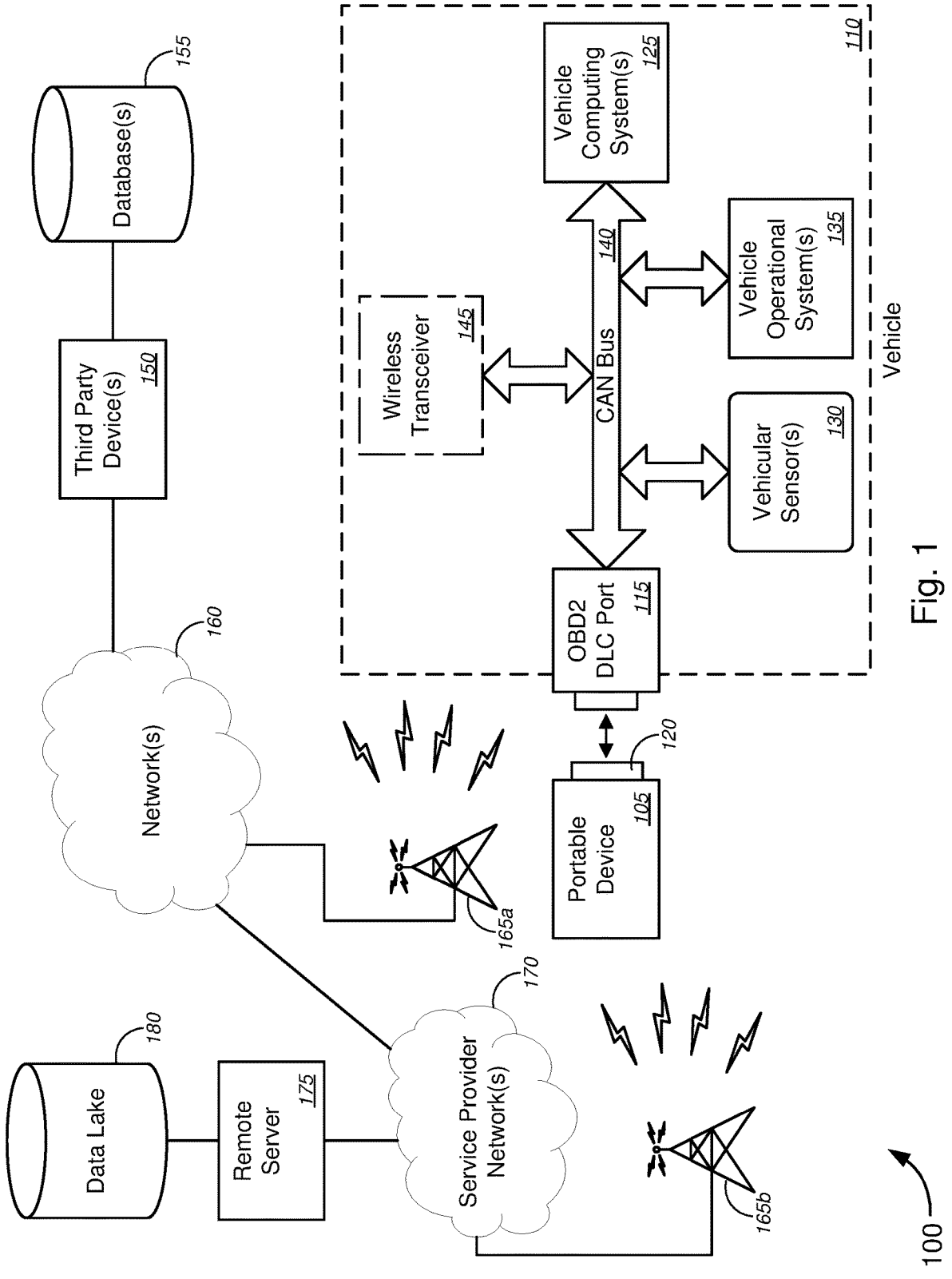
FIG. 1 is a schematic diagram illustrating a system for implementing added services for OBD2 connection for Internet of Things ("IoT")-capable vehicles, in accordance with various embodiments.

Various embodiments provide tools and techniques for implementing Internet of Things ("IoT") functionality, and, in particular embodiments, to methods, systems, apparatus, and computer software for implementing added services for OBD2 connection for IoT-capable vehicles.

In various embodiments, a portable device (when connected to, or plugged into, on-board diagnostics ("OBD2") data link connector ("DLC") port of a vehicle) might monitor wireless communications between at least one vehicle computing system and at least one external device (which might include remote devices associated with hackers or malware-infected devices associated with one of the occupants of the vehicle, or the like), might monitor one or more vehicle sensor data from one or more vehicular sensors tracking operational conditions of the vehicle, and might monitor one or more operator input sensor data from one or more operator input sensors tracking operator input by an operator of the vehicle. The portable device (or a server) might analyze either the monitored wireless communications or a combination of the monitored one or more vehicle sensor data and the monitored one or more operator input sensor data, to determine whether vehicle operation has been compromised. Based on a determination that vehicle operation has been compromised, the portable device (or the server) might alert the operator of the vehicle regarding the vehicle operation being compromised, using the portable device via a user interface, and might initiate one or more remediation operations.

In some embodiments, the one or more sensors tracking operational conditions of the vehicle might include, without limitation, at least one of one or more engine speed sensors, one or more engine air flow sensors, one or more air-fuel mixture sensors, one or more vehicle speed sensors, one or more brake actuator sensors, one or more vehicle traction sensors, one or more vehicle stability sensors, one or more vehicle body motion sensors, and/or the like. The one or more operator input sensors tracking operator input by the operator of the vehicle might include, without limitation, at least one of one or more accelerator pedal position sensors, one or more cruise control switch sensors, one or more brake pedal position sensors, one or more steering angle sensors, and/or the like.

According to some embodiments, the user interface might be embodied within (or on an exterior surface) of the portable device (such as the one or more buttons (either soft/virtual buttons or physical buttons, or the like), switches, toggles, display devices, key pads, or the other input/output devices, or the like), might be embodied within a user interface device that is part of the vehicle (e.g., a dash-mounted display device, a speaker system of the vehicle, the instrument cluster, a heads-up display, and/or the like), and/or might be embodied within at least one user device (including, but not limited to, a laptop computer, a tablet computer, a smart phone, a mobile phone, a portable gaming device, and/or the like) that is associated with the operator (or associated with a passenger of) the vehicle, and/or the like.

The various embodiments herein (as described in detail with respect to the figures) provide solutions: to prevent infection of the vehicle computing system, the vehicular sensors, and/or the operational systems by viruses or other malware; to prevent intrusion attempts by third parties (or hackers, etc.) to remotely control the vehicle; to detect and remove any viruses or other malware that have already infected the vehicle computing system, the vehicular sensors, and/or the operational systems; to restore settings and configurations of the vehicle computing system, the vehicular sensors, and/or the operational systems to previous (uninfected, optimal, or operational) settings and configurations in the case that the viruses, other malware, or intrusion attempts have detrimentally changed or affected the settings and configurations of the vehicle computing system, the vehicular sensors, and/or the operational systems. The various embodiments, in some cases, might also provide encryption functionalities to protect sensor data, control data, or other data used by the various vehicle systems; provide firmware validation functionalities for the firmware of the vehicle computing system, the vehicular sensors, and/or the operational systems; provide custom routing functionality for communications routes amongst the vehicle computing system, the vehicular sensors, and/or the operational systems; and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, vehicle communications technology, IoT communications technology, network security technology for vehicles, and/or the like. In other aspects, certain embodiments, can improve the functioning of user equipment or systems themselves (e.g., telecommunications equipment, network components, etc.), for example, by monitoring, with a portable device via an OBD2 DLC port of a vehicle, wireless communications between at least one vehicle computing system and at least one external device, monitoring, with the portable device via the OBD2 DLC port, one or more vehicle sensor data from one or more vehicular sensors tracking operational conditions of the vehicle, monitoring, with the portable device via the OBD2 DLC port, one or more operator input sensor data from one or more operator input sensors tracking operator input by an operator of the vehicle, analyzing, with the portable device (and/or a remote server), either the monitored wireless communications or a combination of the monitored one or more vehicle sensor data and the monitored one or more operator input sensor data, to determine whether vehicle operation has been compromised, and (if so) initiating, with the portable device, one or more remediation operations (including, but not limited to, disrupting (and in some cases, jamming) some or all wireless communications to/from the vehicle, reconnecting authorized wireless communications, detecting and blocking malware or intrusion attempts via the wireless communications, detecting and removing any malware that have infected the vehicle systems, encrypting and storing vehicle data, sensor data, and/or other data, validating firmware of the vehicle systems, restoring settings and configurations for the (affected or malfunctioning) vehicle systems, providing custom routing functionalities for the vehicle systems, and/or the like). In particular, to the extent any abstract concepts are present in the various embodiments, those concepts can be implemented as described herein by devices, software, systems, and methods that involve specific novel functionality (e.g., steps or operations), such as monitoring wireless communications between at least one vehicle computing system and at least one external device, monitoring one or more vehicle sensor data from one or more vehicular sensors tracking operational conditions of the vehicle, monitoring one or more operator input sensor data from one or more operator input sensors tracking operator input by an operator of the vehicle, analyzing either the monitored wireless communications or a combination of the monitored one or more vehicle sensor data and the monitored one or more operator input sensor data, to determine whether vehicle operation has been compromised, and (if so) initiating one or more remediation operations, and/or the like, to name a few examples, that extend beyond mere conventional computer processing operations. These functionalities can produce tangible results outside of the implementing computer system, including, merely by way of example, proactively securing the vehicle environment and vehicle systems from wireless access and remote disruption of vehicle operations, while assuring driver safety to the extent possible, which may be observed or measured by customers and/or service providers.

In an aspect, a method might comprise monitoring, with a portable device in communication with one or more computing systems of a vehicle via an on-board diagnostics ("OBD2") data link connector ("DLC") port, wireless communications between at least one vehicle computing system of the one or more computing systems of the vehicle and at least one device external to the vehicle; monitoring, with the portable device via the OBD2 DLC port, one or more vehicle sensor data from one or more vehicular sensors tracking operational conditions of the vehicle; and monitoring, with the portable device via the OBD2 DLC port, one or more operator input sensor data from one or more operator input sensors tracking operator input by an operator of the vehicle. The method might further comprise analyzing, with the portable device, at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised; based on a determination that vehicle operation has been compromised, alerting the operator of the vehicle regarding the vehicle operation being compromised, using the portable device via a user interface; and initiating, with the portable device, one or more remediation operations.

In some embodiments, the one or more computing systems of the vehicle might comprise at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), or a vehicular computing node, and/or the like. In some cases, the one or more vehicular sensors might comprise at least one of one or more accelerator pedal position sensors, one or more engine speed sensors, one or more engine air flow sensors, one or more air-fuel mixture sensors, one or more vehicle speed sensors, one or more cruise control switch sensors, one or more brake pedal position sensors, one or more brake actuator sensors, one or more vehicle traction sensors, one or more vehicle stability sensors, one or more vehicle body motion sensors, or one or more steering angle sensors, and/or the like.

According to some embodiments, analyzing the combination of the monitored one or more vehicle sensor data and the monitored one or more operator input sensor data might comprise analyzing, with the portable device, the one or more vehicle sensor data and the one or more operator input sensor data to determine whether the one or more vehicle sensor data indicates operational conditions of the vehicle that are inconsistent with the corresponding one or more operator input sensor data.

In some instances, the vehicle is an Internet of Things ("IoT")-capable vehicle and the at least one device external to the vehicle might comprise at least one IoT-capable device, and the wireless communications between the at least one vehicle computing system and the at least one device external to the vehicle might comprise machine-to-machine IoT communications. In some embodiments, the portable device might be an IoT gateway through which all IoT communications pass, and initiating the one or more remediation operations might comprise, based on a determination that vehicle operation has been compromised by the at least one device external to the vehicle via the machine-to-machine IoT communications and based on the operator action comprising disconnecting the portable device from the OBD2 DLC port, disrupting, with the portable device, communication between the at least one vehicle computing system and the at least one device external to the vehicle. In such embodiments, the method might further comprise, in response to the operator reconnecting the portable device into the OBD2 DLC port, establishing, with the portable device, communication between the at least one vehicle computing system and one or more telematics sources. Alternative to disconnecting the portable device from the OBD2 DLC port, the portable device (which might be an IoT gateway through which all IoT communications pass) might comprise a block-wireless-communications button, and initiating the one or more remediation operations might comprise, based on a determination that vehicle operation has been compromised by the at least one device external to the vehicle via the machine-to-machine IoT communications and based on the operator action comprising depressing the block-wireless-communications button on the portable device, disrupting, with the portable device, communication between the at least one vehicle computing system and the at least one device external to the vehicle.

Regardless of whether or not all wireless communications pass through the portable device, where the portable device comprises a block-wireless-communications button, initiating the one or more remediation operations might comprise, based on a determination that vehicle operation has been compromised by the at least one device external to the vehicle via the wireless communications and based on the operator action comprising depressing the block-wireless-communications button on the portable device, disrupting, with the portable device, communication between the at least one vehicle computing system and the at least one device external to the vehicle by jamming all wireless communications within at least one set of telecommunications frequency ranges to and from the vehicle.

Alternatively, or additionally, the portable device might comprise a restore button, and initiating the one or more remediation operations might comprise, based on a determination that vehicle operation has been compromised by the at least one device external to the vehicle via the wireless communications and based on the operator action comprising depressing the restore button on the portable device, restoring, with the portable device, settings and configurations for at least one of the one or more computing systems of the vehicle, the one or more vehicular sensors, or the one or more operator input sensors, and/or the like. In some cases, the settings and configurations for the at least one of the one or more computing systems of the vehicle, the one or more vehicular sensors, or the one or more operator input sensors, and/or the like might comprise one of factory settings and configurations or previously saved settings and configurations, or the like.

Merely by way of example, in some cases, the method might further comprise encrypting, with the portable device, the monitored one or more vehicle sensor data and the monitored one or more operator input sensor data, and storing, with the portable device, the encrypted one or more vehicle sensor data and the encrypted one or more operator input sensor data in a local data storage device of the portable device. In some instances, encrypting and storing the monitored one or more vehicle sensor data and the monitored one or more operator input sensor data might be performed either before or after analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised. In some embodiments, encrypting the monitored one or more vehicle sensor data and the monitored one or more operator input sensor data might comprise encrypting, with the portable device, the monitored one or more vehicle sensor data and the monitored one or more operator input sensor data, using one or more cryptographic protocols or techniques comprising AES symmetric-key algorithm, Diffie-Hellman key exchange, SHA-1 hash function, forward secrecy, deniable authentication, or malleable encryption, and/or the like.

According to some embodiments, analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised might comprise detecting, with the portable device, whether the wireless communications comprises at least one of one or more viruses, one or more electronic intrusion attempts, or one or more other malicious software, and/or the like, and blocking, with the portable device, the at least one of one or more viruses, one or more electronic intrusion attempts, or one or more other malicious software, and/or the like from infecting the at least one vehicle computing system via the wireless communications.

In some embodiments, the method might further comprise detecting, with the portable device, whether at least one of the one or more computing systems of the vehicle, the one or more vehicular sensors, or the one or more operator input sensors, and/or the like comprises at least one of one or more viruses, one or more electronic intrusion attempts, or one or more other malicious software; and removing, with the portable device, the at least one of one or more viruses, one or more electronic intrusion attempts, or one or more other malicious software from the at least one of the one or more computing systems of the vehicle, the one or more vehicular sensors, or the one or more operator input sensors, and/or the like. According to some embodiments, the method might further comprise validating, with the portable device, firmware of at least one of the one or more computing systems of the vehicle, the one or more vehicular sensors, or the one or more operator input sensors.

In another aspect, a portable device might comprise an on-board diagnostics ("OBD2") data link connector ("DLC") in communication with one or more computing systems of a vehicle via an OBD2 DLC port of the vehicle; at least one processor; a data storage device; and a non-transitory computer readable medium communicatively coupled to the at least one processor. The non-transitory computer readable medium might have stored thereon computer software comprising a set of instructions that, when executed by the at least one processor, causes the portable device to: monitor, via the OBD2 DLC port, wireless communications between at least one vehicle computing system of the one or more computing systems of the vehicle and at least one device external to the vehicle; monitor, via the OBD2 DLC port, one or more vehicle sensor data from one or more vehicular sensors tracking operational conditions of the vehicle; monitor, via the OBD2 DLC port, one or more operator input sensor data from one or more operator input sensors tracking operator input by an operator of the vehicle; analyze at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised; based on a determination that vehicle operation has been compromised, alert the operator of the vehicle regarding the vehicle operation being compromised; and initiate one or more remediation operations.

In some embodiments, the one or more computing systems of the vehicle might comprise at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), or a vehicular computing node, and/or the like. In some cases, the one or more vehicular sensors might comprise at least one of one or more accelerator pedal position sensors, one or more engine speed sensors, one or more engine air flow sensors, one or more air-fuel mixture sensors, one or more vehicle speed sensors, one or more cruise control switch sensors, one or more brake pedal position sensors, one or more brake actuator sensors, one or more vehicle traction sensors, one or more vehicle stability sensors, one or more vehicle body motion sensors, or one or more steering angle sensors, and/or the like.

According to some embodiments, analyzing the combination of the monitored one or more vehicle sensor data and the monitored one or more operator input sensor data might comprise analyzing, with the portable device, the one or more vehicle sensor data and the one or more operator input sensor data to determine whether the one or more vehicle sensor data indicates operational conditions of the vehicle that are inconsistent with the corresponding one or more operator input sensor data.

In some instances, the vehicle is an Internet of Things ("IoT")-capable vehicle and the at least one device external to the vehicle might comprise at least one IoT-capable device, and the wireless communications between the at least one vehicle computing system and the at least one device external to the vehicle might comprise machine-to-machine IoT communications. In some embodiments, the portable device might be an IoT gateway through which all IoT communications pass, and initiating the one or more remediation operations might comprise, based on a determination that vehicle operation has been compromised by the at least one device external to the vehicle via the machine-to-machine IoT communications and based on the operator action comprising disconnecting the portable device from the OBD2 DLC port, disrupting, with the portable device, communication between the at least one vehicle computing system and the at least one device external to the vehicle. In such embodiments, the set of instructions, when executed by the at least one processor, further causes the portable device to: in response to the portable device being reconnected into the OBD2 DLC port, establish communication between the at least one vehicle computing system and one or more telematics sources. Alternative to disconnecting the portable device from the OBD2 DLC port, the portable device (which might be an IoT gateway through which all IoT communications pass) might further comprise a block-wireless-communications button, and initiating the one or more remediation operations might comprise, based on a determination that vehicle operation has been compromised by the at least one device external to the vehicle via the machine-to-machine IoT communications and based on the operator action comprising depressing the block-wireless-communications button on the portable device, disrupting communication between the at least one vehicle computing system and the at least one device external to the vehicle.

Regardless of whether or not all wireless communications pass through the portable device, the portable device might further comprise a block-wireless-communications button and a frequency jamming transmitter, and initiating the one or more remediation operations might comprise, based on a determination that vehicle operation has been compromised by the at least one device external to the vehicle via the wireless communications and based on the operator action comprising depressing the block-wireless-communications button on the portable device, disrupting communication between the at least one vehicle computing system and the at least one device external to the vehicle by jamming, via the frequency jamming transmitter, all wireless communications within at least one set of telecommunications frequency ranges to and from the vehicle.

Alternatively, or additionally, the portable device might further comprise a restore button, and initiating the one or more remediation operations might comprise, based on a determination that vehicle operation has been compromised by the at least one device external to the vehicle via the wireless communications and based on the operator action comprising depressing the restore button on the portable device, restoring settings and configurations for at least one of the one or more computing systems of the vehicle, the one or more vehicular sensors, or the one or more operator input sensors, and/or the like. In some cases, the settings and configurations for the at least one of the one or more computing systems of the vehicle, the one or more vehicular sensors, or the one or more operator input sensors, and/or the like might comprise one of factory settings and configurations or previously saved settings and configurations, or the like.

Merely by way of example, in some cases, the set of instructions, when executed by the at least one processor, further causes the portable device to: encrypt the monitored one or more vehicle sensor data and the monitored one or more operator input sensor data and store the encrypted one or more vehicle sensor data and the encrypted one or more operator input sensor data in the data storage device of the portable device. In some instances, encrypting and storing the monitored one or more vehicle sensor data and the monitored one or more operator input sensor data might be performed either before or after analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised. In some embodiments, encrypting the monitored one or more vehicle sensor data and the monitored one or more operator input sensor data might comprise encrypting the monitored one or more vehicle sensor data and the monitored one or more operator input sensor data, using one or more cryptographic protocols or techniques comprising AES symmetric-key algorithm, Diffie-Hellman key exchange, SHA-1 hash function, forward secrecy, deniable authentication, or malleable encryption, and/or the like.

According to some embodiments, analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised might comprise detecting whether the wireless communications comprises at least one of one or more viruses, one or more electronic intrusion attempts, or one or more other malicious software, and/or the like, and blocking the at least one of one or more viruses, one or more electronic intrusion attempts, or one or more other malicious software, and/or the like from infecting the at least one vehicle computing system via the wireless communications.

In some embodiments, the set of instructions, when executed by the at least one processor, further causes the portable device to: detect whether at least one of the one or more computing systems of the vehicle, the one or more vehicular sensors, or the one or more operator input sensors, and/or the like comprises at least one of one or more viruses, one or more electronic intrusion attempts, or one or more other malicious software, and/or the like; and remove the at least one of one or more viruses, one or more electronic intrusion attempts, or one or more other malicious software, and/or the like from the at least one of the one or more computing systems of the vehicle, the one or more vehicular sensors, or the one or more operator input sensors, and/or the like. According to some embodiments, the set of instructions, when executed by the at least one processor, further causes the portable device to: validate firmware of at least one of the one or more computing systems of the vehicle, the one or more vehicular sensors, or the one or more operator input sensors.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing Internet of Things ("IoT") functionality, and, in particular embodiments, to methods, systems, apparatus, and computer software for implementing added services for OBD2 connection for IoT-capable vehicles, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing added services for OBD2 connection for Internet of Things ("IoT")-capable vehicles, in accordance with various embodiments. In the non-limiting embodiment of FIG. 1, system 100 might comprise a portable device 105, a vehicle 110, and an on-board diagnostics ("OBD2") data link connector ("DLC") port 115 (also referred to as an "OBD2 port" or the like). The OBD2 DLC port 115 is located within the vehicle 110 (and is located within reach of the driver or operator of the vehicle, typically within two feet (or about 61 cm) of the steering wheel). The portable device 105—which is described in detail below with respect to FIG. 2—is configured to physically couple or connect with the OBD2 DLC port 115 via connector 120. The vehicle 110 might comprise a car, minivan, pickup truck, a police vehicle, a fire engine, an ambulance, a recreational vehicle, a semi-tractor-trailer truck, a commercial truck, a bus, or any other vehicle that has an OBD2 DLC port, and/or the like.

Figure 3:
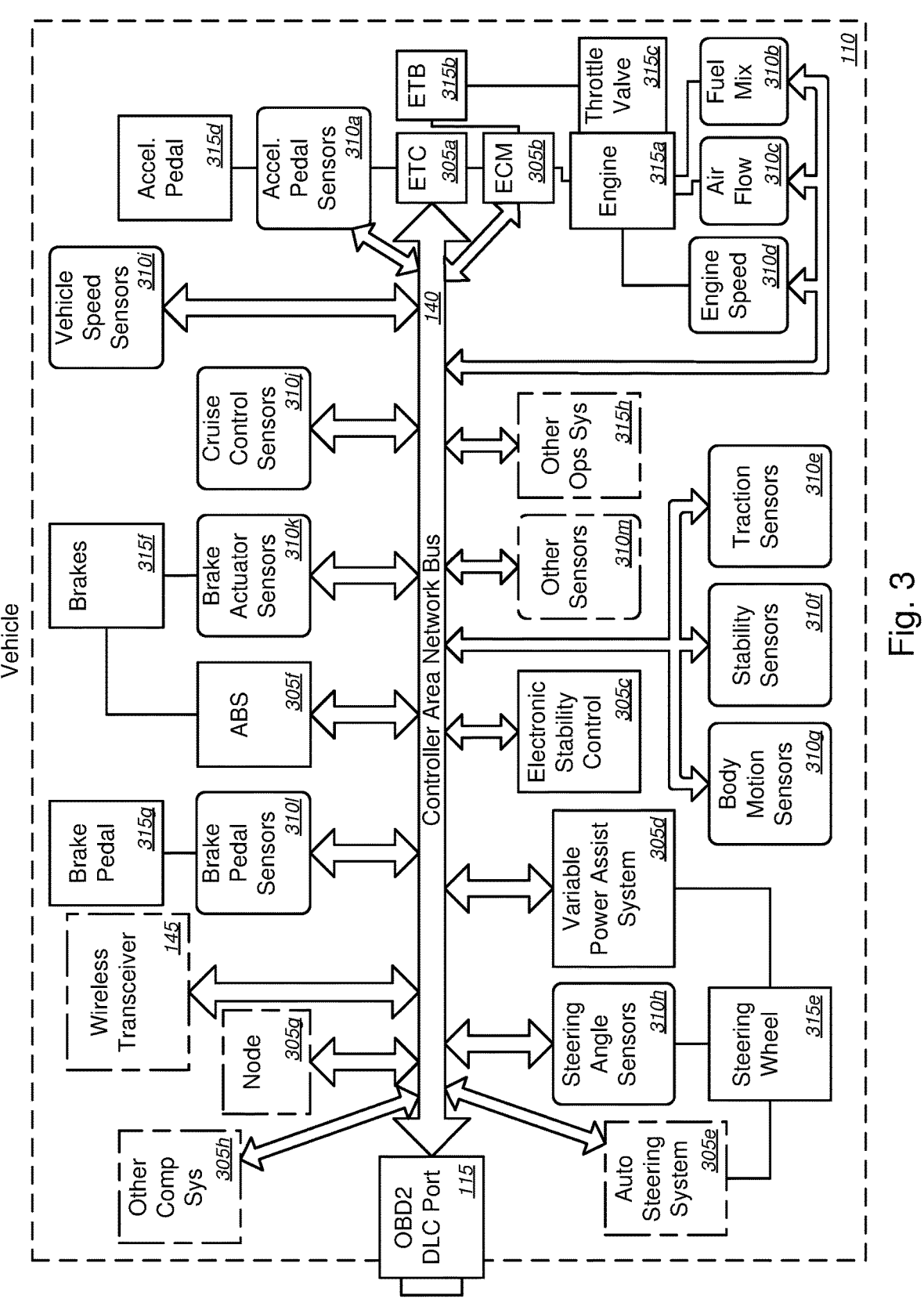
FIG. 3 is a block diagram illustrating the various components of the vehicle of the system of FIG. 1 in the context of implementing added services for OBD2 connection for IoT-capable vehicles, in accordance with various embodiments.
Figure 4:
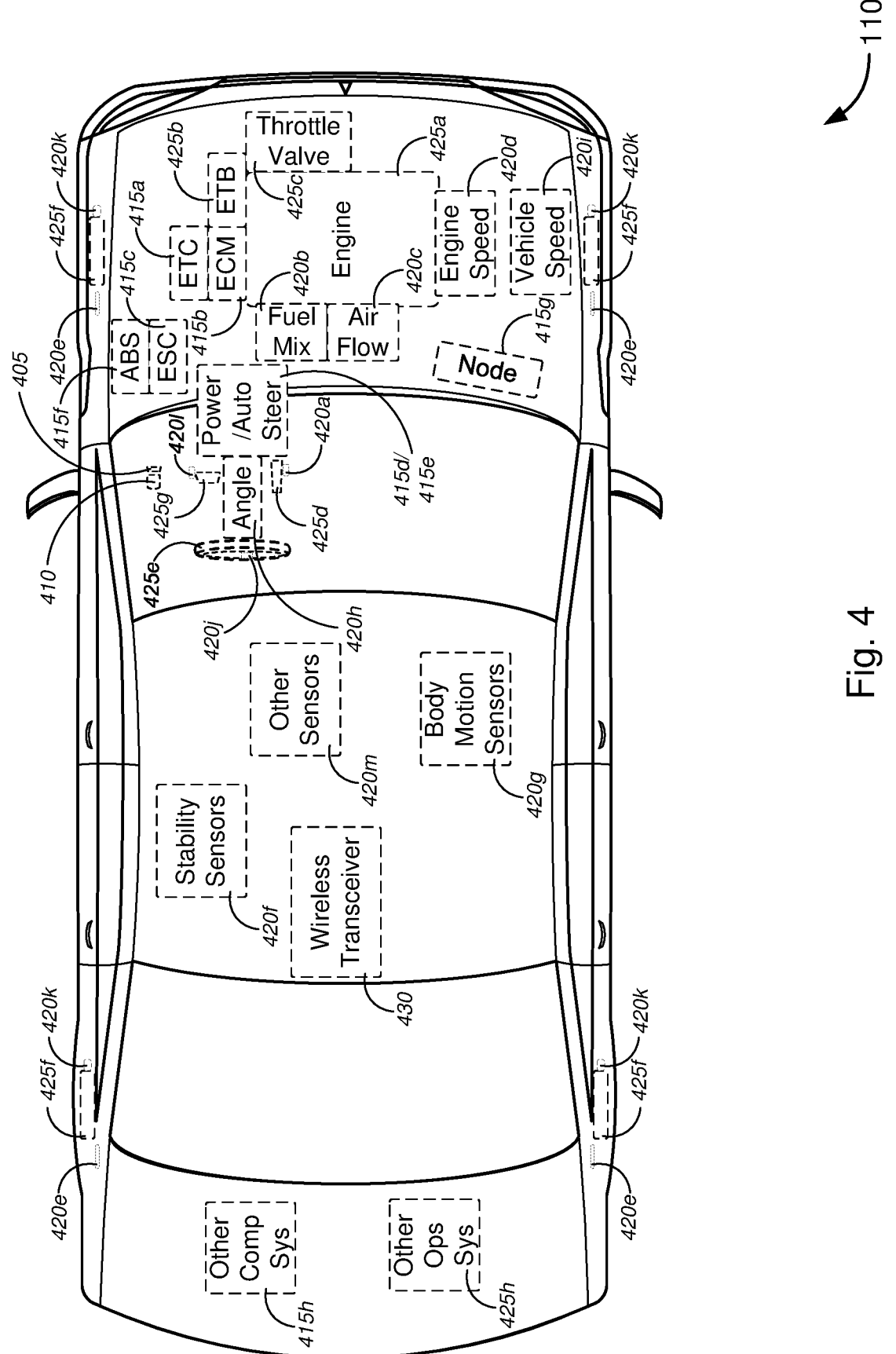
FIG. 4 is a schematic diagram illustrating the various components of the vehicle of the system of FIG. 1 in the context of implementing added services for OBD2 connection for IoT-capable vehicles, in accordance with various embodiments.

In some embodiments, the vehicle 110 might further comprise one or more vehicle computing systems 125, one or more vehicular sensors 130, and one or more vehicle operational systems 135 (collectively, "vehicle systems"), which are described in greater detail with respect to FIGS. 3 and 4. The OBD2 DLC port 115 might communicatively couple to each of the one or more vehicle computing systems 125, the one or more vehicular sensors 130, and the one or more vehicle operational systems 135 via a controller area network ("CAN") bus 140. In some cases, the one or more vehicle computing systems 125 might include, but are not limited to, at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), or a vehicular computing node, and/or the like. In some instances, the one or more vehicular sensors 130 might include one or more sensors tracking operational conditions of the vehicle and one or more operator input sensors tracking operator input by the operator of the vehicle. The one or more sensors tracking operational conditions of the vehicle might include, without limitation, at least one of one or more engine speed sensors, one or more engine air flow sensors, one or more air-fuel mixture sensors, one or more vehicle speed sensors, one or more brake actuator sensors, one or more vehicle traction sensors, one or more vehicle stability sensors, one or more vehicle body motion sensors, and/or the like. The one or more operator input sensors tracking operator input by the operator of the vehicle might include, without limitation, at least one of one or more accelerator pedal position sensors, one or more cruise control switch sensors, one or more brake pedal position sensors, one or more steering angle sensors, and/or the like. The one or more vehicle operational systems 135, in some cases, might include, but are not limited to, at least one of an accelerator pedal, an engine, a throttle valve, a steering wheel, one or more brakes, one or more tires, a brake pedal, or other operational systems, and/or the like.

In some cases, the vehicle might further comprise an (optional) wireless transceiver 145, which might communicatively couple, via the CAN bus 140, to each of the one or more vehicle computing systems 125, the one or more vehicular sensors 130, and the one or more vehicle operational systems 135. According to some embodiments, system 100 might further comprise one or more third party devices 150 and associated databases 155, one or more networks 160, and one or more telecommunications relay systems 165a, and/or the like. The system 100 might, in some instances, further comprise a service provider network (s) 170 associated with a service provider, a remote server 175, which may also be associated with the service provider, a database(s) or data lake 180 associated with the service provider, and one or more telecommunications relay systems 165b, and/or the like. In some cases, the networks 160 and 170 might each include, but is not limited to, one or more of a local area network ("LAN"), a wide area network ("WAN"), a wireless wide area network ("WWAN"), a virtual private network ("VPN"), the Internet, or an extranet, and/or the like. Other networks that can be implemented as network 160 or 170 are described below with reference to FIG. 7. The one or more telecommunications relay systems 165a or 165b might each include, without limitation, one or more wireless network interfaces (e.g., wireless modems, wireless access points, and the like), one or more towers, one or more satellites, and/or the like.

Figure 7:
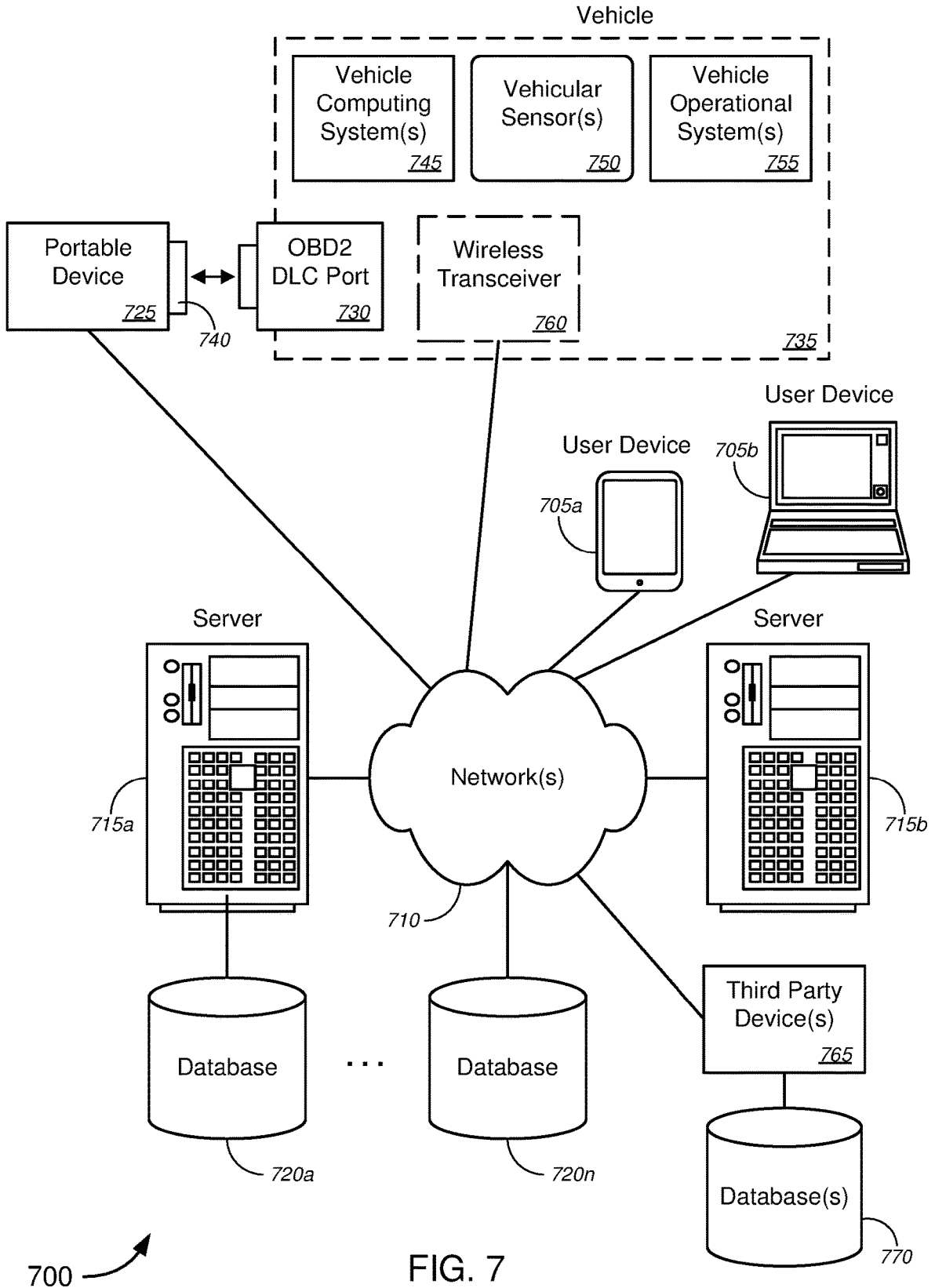
FIG. 7 is a block diagram illustrating a networked system of computers, computing systems, or system hardware architecture, which can be used in accordance with various embodiments.

The wireless transceiver 145 might provide wireless access to sensor data, command data, updates, etc. for at least one of the one or more vehicle computing systems 125, the one or more vehicular sensors 130, and the one or more vehicle operational systems 135, or might provide an external user device (e.g., third party device(s) 150, user devices associated with the user (as shown in FIG. 7), and/or the like), server (e.g., remote server 175, or the like), or other computing system with access, via wireless communication (in some cases, via network(s) 160, via service provider network(s) 170, via one or more telecommunications relay systems 165a and/or 165b, and/or the like), to at least one of the one or more vehicle computing systems 125, the one or more vehicular sensors 130, and the one or more vehicle operational systems 135.

In operation, the portable device 105 (when connected to, or plugged into, the OBD2 DLC port 115) might monitor wireless communications between at least one vehicle computing system of the one or more vehicle computing systems 125 (or the vehicle systems collectively) and at least one third party device 150 (or other device external to the vehicle 110). The portable device 105 (when connected to, or plugged into, the OBD2 DLC port 115) might also monitor one or more vehicle sensor data from one or more vehicular sensors 130 (which might include, without limitation, at least one of one or more engine speed sensors, one or more engine air flow sensors, one or more air-fuel mixture sensors, one or more vehicle speed sensors, one or more brake actuator sensors, one or more vehicle traction sensors, one or more vehicle stability sensors, one or more vehicle body motion sensors, and/or the like) tracking operational conditions of the vehicle (i.e., conditions of the one or more vehicle operational systems 135 or the like) and might also monitor one or more operator input sensor data from one or more operator input sensors 130 (including, but not limited to, at least one of one or more accelerator pedal position sensors, one or more cruise control switch sensors, one or more brake pedal position sensors, one or more steering angle sensors, and/or the like) tracking operator input by an operator of the vehicle 110.

In some embodiments, the portable device 105 (and/or the remote server 175, or the like) might analyze at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised. According to some embodiments, analyzing the combination of the monitored one or more vehicle sensor data and the monitored one or more operator input sensor data might comprise analyzing, with the portable device (and/or with the remote computing system), the one or more vehicle sensor data and the one or more operator input sensor data to determine whether the one or more vehicle sensor data indicates operational conditions of the vehicle that are inconsistent with the corresponding one or more operator input sensor data (which might be due to system failures or errors over time or due to accident or the like, or might be due to malicious activity by a third party (e.g., a hacker or the like)). Further analyzing the monitored wireless communications might help to determine whether any inconsistencies between the operator input and the operational conditions of the vehicle are due to maintenance-related issues or due to malicious activity by a third party (e.g., a hacker or the like).

Based on a determination that vehicle operation has been compromised, the portable device 105 (and/or the remote server, or the like) might alert the operator of the vehicle regarding the vehicle operation being compromised, using the portable device via a user interface. According to some embodiments, the user interface might be embodied within (or on an exterior surface) of the portable device 105 (such as the one or more buttons (either soft/virtual buttons or physical buttons, or the like), switches, toggles, display devices, key pads, or the other input/output devices, or the like), might be embodied within a user interface device that is part of the vehicle (e.g., a dash-mounted display device, a speaker system of the vehicle, the instrument cluster, a heads-up display, and/or the like), and/or might be embodied within at least one user device (including, but not limited to, a laptop computer, a tablet computer, a smart phone, a mobile phone, a portable gaming device, and/or the like) that is associated with the operator (or associated with a passenger of) the vehicle (see, e.g., the embodiment of FIG. 7 or the like), and/or the like. The portable device 105 (and/or the remote server, or the like) might subsequently initiate one or more remediation operations (such as the remediation operations as shown and described in detail with respect to FIG. 5, or the like).

In some cases, the portable device 105 might be configured to set up the wireless transceiver 145 so that any wireless communications to/from any external devices via the wireless transceiver 145 must first be routed through the portable device 105. This allows for sensitive or private information regarding the functioning of the vehicle to be encrypted or prevented from being transmitted to non-authorized external devices, while allowing for detection and blocking of any computer viruses, intrusion attempts, and/or other malicious software ("malware") sent by external devices, via the wireless transceiver, to at least one of the one or more vehicle computing systems 125, the one or more vehicular sensors 130, and/or the one or more vehicle operational systems 135. The portable device might also perform firmware validation for the firmware of the at least one of the one or more vehicle computing systems 125, the one or more vehicular sensors 130, and/or the one or more vehicle operational systems 135. In some cases, the portable device might also provide custom routing functionality for communications routes amongst the two or more of the one or more vehicle computing systems 125, the one or more vehicular sensors 130, and/or the one or more vehicle operational systems 135. These and other functionalities are described in detail with respect to FIGS. 5 and 7.

Figure 2:
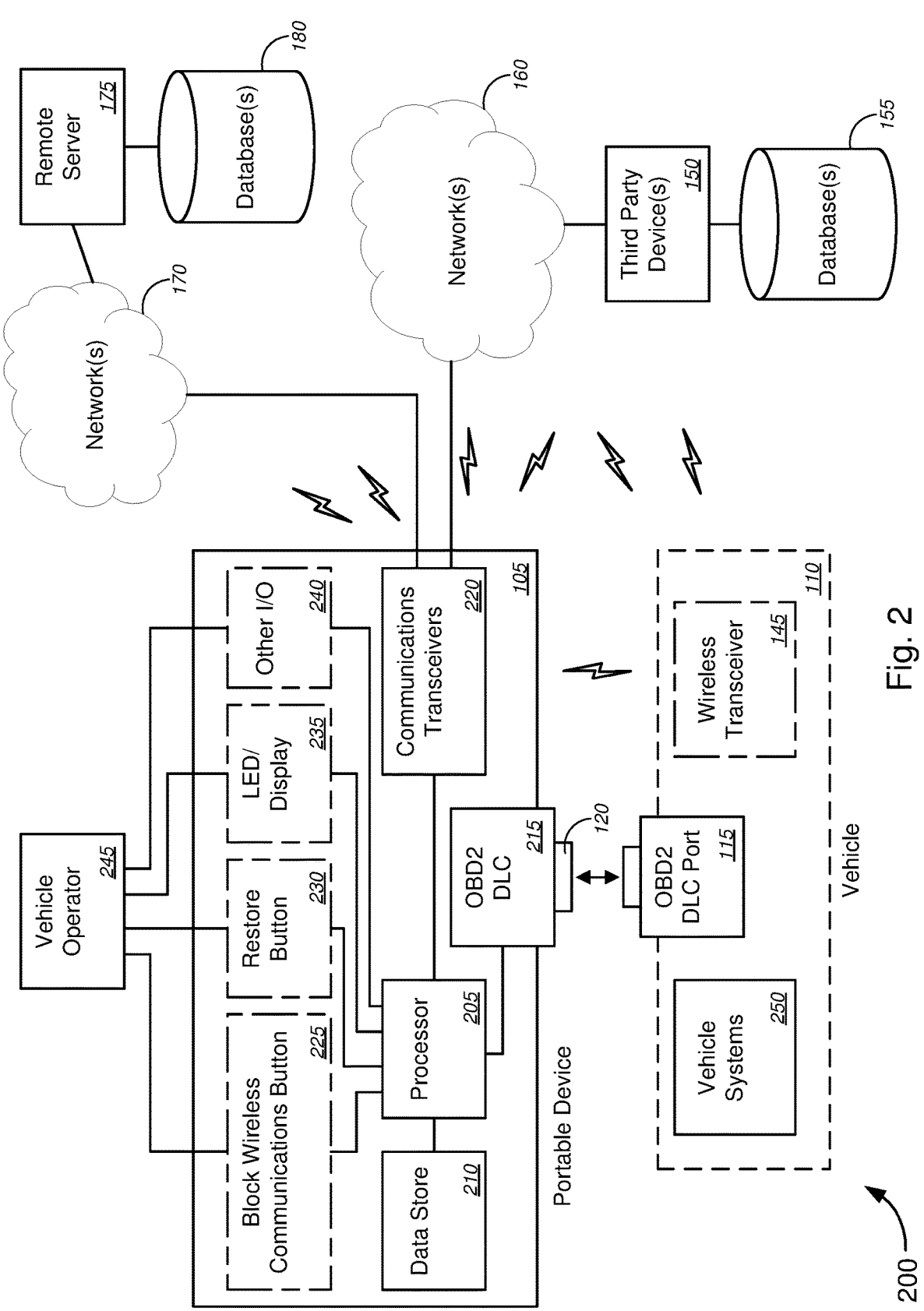
FIG. 2 is a schematic diagram illustrating the portable device of the system of FIG. 1 in the context of a system for implementing added services for OBD2 connection for IoT-capable vehicles, in accordance with various embodiments.

FIG. 2 is a schematic diagram illustrating the portable device of the system of FIG. 1 in the context of a system 200 for implementing added services for OBD2 connection for IoT-capable vehicles, in accordance with various embodiments. In the embodiment of FIG. 2, system 200 might comprise portable device 105 (which might correspond to the portable device 105 of system 100 of FIG. 1, or the like), vehicle 110 (which might correspond to the vehicle 110 of system 100 of FIG. 1, or the like), one or more third party devices 150 and associated databases 155 (which might correspond to the one or more third party devices 150 and associated databases 155 of system 100 of FIG. 1, or the like), one or more networks 160 (which might correspond to network(s) 160 of system 100 of FIG. 1, or the like), one or more networks 170 (which might correspond to service provider network(s) 170 of system 100 of FIG. 1, or the like), remote server 175 and associated database(s) 180 (which might correspond to the remote server 175 and associated data lake 180 of system 100 of FIG. 1, or the like), and/or the like.

Merely by way of example, according to some embodiments, the portable device 105, which in some cases might be embodied as an OBD2 dongle or the like—might include, but is not limited to, at least one processor 205, a local data storage device or data store 210, an OBD2 DLC 215 (also referred to as "OBD2 connector 215"), one or more communications transceivers 220, one or more buttons (optional) (including, without limitation, a block-wireless-communications button 225, a restore button 230, a power button (not shown), a scan button (not shown), and/or the like), one or more LED/display devices 235 (optional) (e.g., non-touchscreen display, touchscreen display, etc.), one or more other input/output ("I/O") devices 240 (optional) (e.g., switches, toggles, key pads, microphone or other voice input, speakers, etc.), and/or the like. A vehicle operator 245 (e.g., a driver of the vehicle) might interact with the portable device 105 by interacting with at least one of the one or more buttons, the LED/display devices 235, and/or the other I/O device 240, e.g., by pressing (or depressing or making contact with) the (virtual or physical) buttons, the touchscreen display 235, the key pads, switches, toggles, etc., by looking at the display device 235 (whether non-touchscreen or touchscreen), by talking into the microphone, by listening to the speaker outputs, and/or the like. The vehicle operator 245 might also interact with the portable device 105 by plugging (or inserting) the portable device 105 into the OBD2 DLC port 115 of the vehicle 110 or by unplugging (or removing) the portable device 105 from the OBD2 DLC port 115 of the vehicle 110.

The vehicle 110 might comprise the OBD2 DLC port 115, a wireless transceiver 145 (optional), and one or more vehicle systems 250. The one or more vehicle systems 250 might include, but are not limited to, one or more vehicle computing systems (which might correspond to the one or more vehicle computing systems 125 of FIG. 1), one or more vehicular sensors (which might correspond to the one or more vehicular sensors 130 of FIG. 1), and one or more vehicle operational systems (which might correspond to the one or more vehicle operational systems 135 of FIG. 1), and/or the like.

The communications transceivers 220 might communicatively couple with at least one of the wireless transceiver 145 (optional), at least one third party device 150 of the one or more third party devices 150 (via network(s) 160), the remote server 175 (via network(s) 170), any user devices associated with the vehicle operator 245 or one of the passengers (shown in FIG. 7 as user devices 705 or the like), and/or the like, as depicted in FIG. 2 by the solid lines between the communications transceivers 220 and each of the networks 160 and 170 and by the lightning bolt symbols. The wireless transceiver 145 might, in some cases, also communicatively couple with at least one third party device 150 of the one or more third party devices 150 (either directly or via network(s) 160). Although lightning bolt symbols are used to denote wireless communications between the portable device 105 and each of the wireless transceiver 145 (optional), the one or more third party devices 150, the network(s) 160, the remote server 175, and the network(s) 170, and between the wireless transceiver 145 and each of the third party devices 150 and the network(s) 160, the various embodiments are not so limited, and wired as well as wireless communications may be used.

The portable device 105, vehicle 110, the OBD2 DLC port 115, the OBD2 connector 120, the (optional) wireless transceiver 145, vehicle systems 250 (which comprises the one or more vehicle computing systems, the one or more vehicular sensors, and the one or more vehicle operational systems), the one or more third party devices 150, the one or more databases 155, the network(s) 160, the network(s) 170, the remote server 175, the one or more databases 180, of system 200 FIG. 2 might otherwise be similar, if not identical, to portable device 105, the vehicle 110, the OBD2 DLC port 115, the OBD2 connector 120, the (optional) wireless transceiver 145, vehicle systems (which comprises the one or more vehicle computing systems 125, the one or more vehicular sensors 130, and the one or more vehicle operational systems 135), the one or more third party devices 150, the one or more databases 155, the network(s) 160, the service provider network(s) 170, the remote server 175, the data lake 180, respectively, of system 100 of FIG. 1, and the descriptions of these components of system 100 are applicable to the corresponding components of system 200 of FIG. 2, respectively.

FIG. 3 is a block diagram illustrating the various components of the vehicle 110 of the system of FIG. 1 in the context of implementing added services for OBD2 connection for IoT-capable vehicles, in accordance with various embodiments. In FIG. 3, the blocks having dash-long dash borders represent optional blocks.

In the non-limiting example of FIG. 3, the vehicle 110 might comprise the OBD2 DLC port 115, the controller area network ("CAN") bus 140, and the (optional) wireless transceiver 145, as described above with respect to FIGS. 1 and 2. CAN bus 140 might communicatively couple the OBD2 DLC port 115 and the (optional) wireless transceiver 145 with each of the vehicle systems 250 (of FIG. 2), which might comprise one or more vehicle computing systems 305 (which corresponds to one or more vehicle computing systems 125 of FIG. 1), one or more vehicular sensors 310 (which corresponds to the one or more vehicular sensors 130 of FIG. 1), and one or more vehicle operational systems 315 (which corresponds to the one or more vehicle operational systems 135 of FIG. 1), and/or the like.

In FIG. 3, according to some embodiments, the one or more vehicle computing systems 305 might include, without limitation, at least one of an electronic throttle control ("ETC") system 305a, an electronic control unit ("ECU") or an electronic control module ("ECM") 305b, an electronic stability control ("ESC") system 305c, a variable-assist power steering system 305d, an automatic steering system 305e, a vehicle brake system or an anti-lock braking system ("ABS") 305f, a vehicular computing node 305g, or other computing systems 305h, and/or the like. The other computing systems 305h might, in some instances, include, but are not limited to, a collision detection/avoidance system, a navigation system, and/or the like.

In some embodiments, the one or more vehicular sensors 310 (which are depicted in FIG. 3 as rounded rectangular blocks) might include, but are not limited to, at least one of two or more accelerator pedal position sensors 310a, one or more air-fuel mixture sensors 310b, one or more engine air flow sensors 310c, one or more engine speed sensors 310d, one or more vehicle traction sensors 310e, one or more vehicle stability sensors 310f, one or more vehicle body motion sensors 310g, one or more steering angle sensors 310h, one or more vehicle speed sensors 310i, one or more cruise control switch sensors 310j, one or more brake actuator sensors 310k, two or more brake pedal position sensors 310l, or one or more other sensors 310m, and/or the like. The one or more other sensors 310m, in some instances, might include, without limitation, an engine temperature sensor, a fuel level sensor, one or more proximity sensors (e.g., vehicle camera-based collision avoidance system, the vehicle radar-based proximity detection system, the vehicle lidar-based proximity detection system, the vehicle sonar-based proximity detection system, etc.), one or more tire diagnostic sensors (e.g., tire-pressure sensors, tire thread sensors, tire temperature sensors, tire slip sensors, etc.), one or more other temperature sensors (e.g., heat sensors, infra-red sensors, thermometers, etc.), one or more light sensors (e.g., ambient light sensors, luminosity sensors, illuminance sensors, solar light sensors, etc.), one or more cameras, one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more fluid leak detectors, one or more occupant sensors, one or more impact sensors, or one or more suspension system diagnostic sensors, and/or the like.

According to some embodiments, the one or more vehicle operational systems 315 might include, without limitation, at least one of an engine 315a, an electronic throttle body ("ETB") 315b (which comprises an electric motor or the like), a throttle valve 315c (which controls the amount of air going into the engine 315a, and is controlled by the ETB 315b), an accelerator pedal 315d, a steering wheel 315e, one or more brakes 315f, a brake pedal 315g, or other operational systems 315h, and/or the like. In some cases, the other operational systems 315h might include, but are not limited to, a navigation display device system, a vehicle (analog or digital) instrument gauge cluster, a vehicle heads-up-display ("HUD") system, and/or the like.

As shown in FIG. 3, ETC 305a, which comprises or controls the ECM 305b, might receive data from the two or more accelerator pedal position sensors 310a (which detect the position of the accelerator pedal 315d in response to the operator stepping on or releasing the accelerator pedal 315d) and might send instructions to the ECM 305b to control the ETB 315b to open or close throttle valve 315c by a calculated or predetermined amount based in part on the accelerator pedal position (and in some cases, based in part on cruise control settings data from the cruise control sensors 310j, which track cruise control settings inputs by the operator). In some cases, the ECM 305b might also control the ETB 315b based in part on the engine speed (as measured by the engine speed sensor 310d) and based in part on the vehicle speed (as measured by the vehicle speed sensor 310i), and/or the like. The throttle valve 315c controls the amount of air going into the engine 315a, which controls the combustion in the engine. The engine speed, air flow, and fuel mixture in the engine 315a can be measured by the one or more air-fuel mixture sensors 310b, the one or more engine air flow sensors 310c, and the one or more engine speed sensors 310d, respectively, or the like. Such data may also be used by the ETC 305a to control the operation of the engine 315.

According to some embodiments, the steering angle sensors 310h might track the angle of rotation and speed of rotation of the steering wheel 315e while the operator is steering. The variable power assist system 305d uses this input to turn the (front) tires of the vehicle (or to otherwise turn the vehicle or change direction of travel of the vehicle, or the like). In some cases, the electronic stability control system 305c might utilize the steering angle information in conjunction with data from one or more of the traction sensors 310e, the stability sensors 310f, and/or the body motion sensors 310g to adjust the amount by which the variable power assist system 305d turns the vehicle, so as to prevent loss of control of the vehicle, roll-overs, or the like. In some embodiments, an automatic steering system 305e (optional) might provide corrective steering to avoid collisions or other obstacles despite operator error, or might provide autonomous driving functionality (or actual "auto pilot" functionality). The brake system or ABS 305f might receive data from the two or more brake pedal position sensors 310l (which detect the position of the brake pedal 315g in response to the operator stepping on or releasing the brake pedal 315g) and might send instructions to the brakes 315f apply braking pressure on some or all of the tires of the vehicle 110 by a calculated amount or predetermined amount based at least in part on the brake pedal position (and in some cases, by the cruise control sensors 310j, which track cruise control settings inputs by the operator), so as to slow down or stop the motion of the vehicle 110. The brake actuator sensors 310k detect the effectiveness of the brakes 315f (and might alert the operator if the brake efficiency is declining, such as due to worn brake pads, worn or damaged brake discs, or worn or damaged other brake components, or the like). The vehicle speed sensors 310i provide vehicle speed information to at least one of the ETC 305a, the electronic stability control system 305c, the auto steering system 305e, the ABS 305f, the computing node 305g, and/or the like.

Due to the electronic connection, rather than a mechanical linkage, between the control systems of the vehicle (e.g., accelerator pedal 315c, brake pedal 315f, steering wheel 315d, and/or the like) and the corresponding operational systems of the vehicle (e.g., engine 315a or throttle valve 315b, brakes 315e, variable power assist system 305e, and/or the like), and due to potential security issues that exist with wireless communications with which modern vehicles are now equipped, third parties (e.g., hackers or the like) might be able to either control the operation of the vehicle from afar (i.e., remotely) by hacking into the vehicle computing system, the vehicular sensors, and/or the operational systems via the wireless communications system of the vehicle. In some cases, such third parties (or hackers, etc.) might send computer viruses or other malware to infect the vehicle computing system, the vehicular sensors, and/or the operational systems via the wireless communications system of the vehicle.

The various embodiments herein (as described in detail above with respect to FIG. 1 and below with respect to FIG. 5) provide solutions: to prevent infection of the vehicle computing system, the vehicular sensors, and/or the operational systems by viruses or other malware; to prevent intrusion attempts by third parties (or hackers, etc.) to remotely control the vehicle; to detect and remove any viruses or other malware that have already infected the vehicle computing system, the vehicular sensors, and/or the operational systems; to restore settings and configurations of the vehicle computing system, the vehicular sensors, and/or the operational systems to previous (uninfected, optimal, or operational) settings and configurations in the case that the viruses, other malware, or intrusion attempts have detrimentally changed or affected the settings and configurations of the vehicle computing system, the vehicular sensors, and/or the operational systems. The various embodiments, in some cases, might also provide encryption functionalities to protect sensor data, control data, or other data used by the various vehicle systems; provide firmware validation functionalities for the firmware of the vehicle computing system, the vehicular sensors, and/or the operational systems; provide custom routing functionality for communications routes amongst the vehicle computing system, the vehicular sensors, and/or the operational systems; and/or the like. These and other functionalities are described in detail with respect to FIGS. 1, 2, 5, and 7.

The vehicle 110, the OBD2 DLC port 115, the CAN bus 140, the (optional) wireless transceiver 145, the one or more vehicle computing systems 305, one or more vehicular sensors 310, and the one or more vehicle operational systems 315 of FIG. 3 are otherwise similar, if not identical, to the vehicle 110, the OBD2 DLC port 115, the CAN bus 140, the (optional) wireless transceiver 145, the one or more vehicle computing systems 125, one or more vehicular sensors 130, and the one or more vehicle operational systems 135, respectively, of system 100 of FIG. 1, and the descriptions of these components of system 100 are applicable to the corresponding components of FIG. 3, respectively.

FIG. 4 is a schematic diagram illustrating the various components of the vehicle 110 of the system of FIG. 1 in the context of implementing added services for OBD2 connection for IoT-capable vehicles, in accordance with various embodiments. Herein, the dash-lined modules representing the various vehicle components described below denote that the particular vehicle components are at or below the surface of the body of the vehicle 110. For purposes of illustration only, the various vehicle components are depicted in approximate relative positions with respect to other vehicle components (although some vehicle components are shown as block modules whose depicted sizes would be different in the actual components and whose depicted relative positions would also differ when actually installed in the vehicle). Although certain vehicle components are shown in particular relative positions within the vehicle 110, such vehicle components need not be located in the particular relative positions as shown, and can be positioned in any portion of the vehicle as the designers/manufacturers of the vehicle deem appropriate.

In the embodiment of FIG. 4, the vehicle 110 might comprise OBD2 DLC port 405, with which a portable device 410 (which might correspond to portable devices 105 of FIGS. 1 and 2, or the like) might physically couple or connect. The vehicle 110 might further comprise one or more vehicle computing systems 415 (which corresponds to one or more vehicle computing systems 125 of FIG. 1), one or more vehicular sensors 420 (which corresponds to the one or more vehicular sensors 130 of FIG. 1), and one or more vehicle operational systems 425 (which corresponds to the one or more vehicle operational systems 135 of FIG. 1), and/or the like. In some cases, the vehicle 110 might further comprise a wireless transceiver 430 (optional) (which might correspond to wireless transceiver 145 of FIGS. 1-3, or the like).

In FIG. 3, according to some embodiments, the one or more vehicle computing systems 415 might include, without limitation, at least one of an electronic throttle control ("ETC") system 415a, an electronic control unit ("ECU") or an electronic control module ("ECM") 415b, an electronic stability control ("ESC") system 415c, a variable-assist power steering system 415d, an automatic steering system 415e, a vehicle brake system or an anti-lock braking system ("ABS") 415f, a vehicular computing node 415g, or other computing systems 415h, and/or the like. The other computing systems 415h might, in some instances, include, but are not limited to, a collision detection/avoidance system, a navigation system, and/or the like.

In some embodiments, the one or more vehicular sensors 420 might include, but are not limited to, at least one of two or more accelerator pedal position sensors 420a, one or more air-fuel mixture sensors 420b, one or more engine air flow sensors 420c, one or more engine speed sensors 420d, one or more vehicle traction sensors 420e, one or more vehicle stability sensors 420f, one or more vehicle body motion sensors 420g, one or more steering angle sensors 420h, one or more vehicle speed sensors 420i, one or more cruise control switch sensors 420j, one or more brake actuator sensors 420k, two or more brake pedal position sensors 420l, or one or more other sensors 420m, and/or the like. The one or more other sensors 420m, in some instances, might include, without limitation, an engine temperature sensor, a fuel level sensor, one or more proximity sensors (e.g., vehicle camera-based collision avoidance system, the vehicle radar-based proximity detection system, the vehicle lidar-based proximity detection system, the vehicle sonar-based proximity detection system, etc.), one or more tire diagnostic sensors (e.g., tire-pressure sensors, tire thread sensors, tire temperature sensors, tire slip sensors, etc.), one or more other temperature sensors (e.g., heat sensors, infra-red sensors, thermometers, etc.), one or more light sensors (e.g., ambient light sensors, luminosity sensors, illuminance sensors, solar light sensors, etc.), one or more cameras, one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more fluid leak detectors, one or more occupant sensors, one or more impact sensors, or one or more suspension system diagnostic sensors, and/or the like.

According to some embodiments, the one or more vehicle operational systems 425 might include, without limitation, at least one of an engine 425a, an electronic throttle body ("ETB") 425b (which comprises an electric motor or the like), a throttle valve 425c (which controls the amount of air going into the engine 425a, and is controlled by the ETB 425b), an accelerator pedal 425d, a steering wheel 425e, one or more brakes 425f, a brake pedal 425g, or other operational systems 425h, and/or the like. In some cases, the other operational systems 425h might include, but are not limited to, a navigation display device system, a vehicle (analog or digital) instrument gauge cluster, a vehicle heads-up-display ("HUD") system, and/or the like.

The vehicle 110, the OBD2 DLC port 405, the (optional) wireless transceiver 430, the one or more vehicle computing systems 415 (including, without limitation, the ETC system 415a, the ECU or the ECM 415b, the ESC system 415c, the variable-assist power steering system 415d, the automatic steering system 415e, the vehicle brake system or the ABS 415f, the vehicular computing node 415g, or the other computing systems 415h, and/or the like), one or more vehicular sensors 420 (including, but not limited to, the two or more accelerator pedal position sensors 420a, the one or more air-fuel mixture sensors 420b, the one or more engine air flow sensors 420c, the one or more engine speed sensors 420d, the one or more vehicle traction sensors 420c, the one or more vehicle stability sensors 420f, the one or more vehicle body motion sensors 420g, the one or more steering angle sensors 420h, the one or more vehicle speed sensors 420i, the one or more cruise control switch sensors 420j, the one or more brake actuator sensors 420k, the two or more brake pedal position sensors 420l, or the one or more other sensors 420m, and/or the like), and the one or more vehicle operational systems 425 (including, without limitation, the engine 425a, the ETB 425b, the throttle valve 425c, the accelerator pedal 425d, the steering wheel 425c, the one or more brakes 425f, the brake pedal 425g, or the other operational systems 425h, and/or the like) of FIG. 4 might otherwise be similar, if not identical, to the vehicle 110, the OBD2 DLC port 115, the CAN bus 140, the (optional) wireless transceiver 145, the one or more vehicle computing systems 305 (including, without limitation, the ETC system 305a, the ECU or the ECM 305b, the ESC system 305c, the variable-assist power steering system 305d, the automatic steering system 305e, the vehicle brake system or the ABS 305f, the vehicular computing node 305g, or the other computing systems 305h, and/or the like), one or more vehicular sensors 310 (including, but not limited to, the two or more accelerator pedal position sensors 310a, the one or more air-fuel mixture sensors 310b, the one or more engine air flow sensors 310c, the one or more engine speed sensors 310d, the one or more vehicle traction sensors 310e, the one or more vehicle stability sensors 310f, the one or more vehicle body motion sensors 310g, the one or more steering angle sensors 310h, the one or more vehicle speed sensors 310i, the one or more cruise control switch sensors 310j, the one or more brake actuator sensors 310k, the two or more brake pedal position sensors 310l, or the one or more other sensors 310m, and/or the like), and the one or more vehicle operational systems 315 (including, without limitation, the engine 315a, the ETB 315b, the throttle valve 315c, the accelerator pedal 315d, the steering wheel 315e, the one or more brakes 315f, the brake pedal 315g, or the other operational systems 315h, and/or the like), respectively, of FIG. 3, and the descriptions of these components of FIG. 3 are applicable to the corresponding components of FIG. 4, respectively. The portable device 410 of FIG. 4 might otherwise be similar, if not identical, to the portable device 105 of system 100 of FIG. 1 or system 200 of FIG. 2, and the descriptions of the portable device 105 of FIGS. 1 and 2 are applicable to the portable device of FIG. 4.

Figure 5:
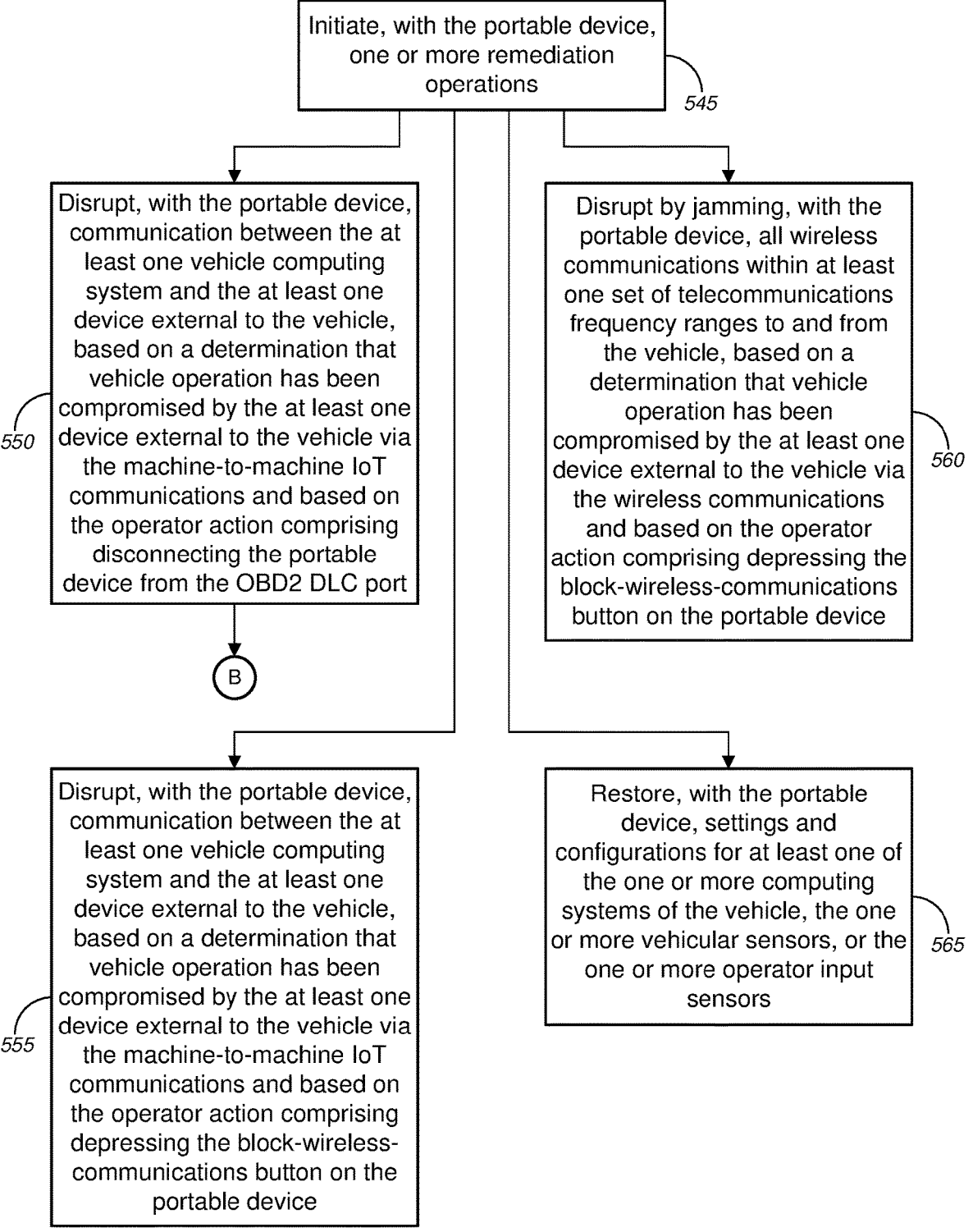
FIGS. 5A-5D are flow diagrams illustrating a method for implementing added services for OBD2 connection for IoT-capable vehicles, in accordance with various embodiments.

FIGS. 5A-5C (collectively, "FIG. 5") are flow diagrams illustrating a method 500 for implementing added services for OBD2 connection for IoT-capable vehicles, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100 and 200 of FIGS. 1 and 2, respectively (or components thereof), as well as vehicle 110 (or components thereof) of FIGS. 3 and 4, such methods may also be implemented using any suitable hardware (or software) implementation. Similarly, while each of the systems 100 and 200 of FIGS. 1 and 2, respectively (or components thereof), as well as vehicle 110 (or components thereof) of FIGS. 3 and 4, can operate according to the method 500 or 500' illustrated by FIG. 5 (e.g., by executing instructions embodied on a computer readable medium), the systems 100 and 200 of FIGS. 1 and 2, as well as vehicle 110 of FIGS. 3 and 4 can each also operate according to other modes of operation and/or perform other suitable procedures.

In the non-limiting embodiment of FIG. 5A, method 500 might comprise, at block 505, monitoring, with a portable device (which might correspond to portable devices 105 and 410 of FIGS. 1, 2, and 4, or the like) in communication with one or more computing systems of a vehicle (which might correspond to vehicle 110 of FIGS. 1-4, or the like) via an on-board diagnostics ("OBD2") data link connector ("DLC") port (which might correspond to OBD2 DLC port 115 and 405 of FIGS. 1-4, or the like), wireless communications between at least one vehicle computing system of the one or more computing systems of the vehicle and at least one device external to the vehicle. In some cases, the one or more computing systems (which might correspond to vehicle computing systems 125, 305a-305i, and 415a-415i of FIGS. 1, 3, and 4, or the like) of the vehicle might include, without limitation, at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), or a vehicular computing node, and/or the like.

Method 500 might further comprise monitoring, with the portable device via the OBD2 DLC port, one or more vehicle sensor data from one or more vehicular sensors tracking operational conditions of the vehicle (block 510) and monitoring, with the portable device via the OBD2 DLC port, one or more operator input sensor data from one or more operator input sensors tracking operator input by an operator of the vehicle (block 515). In some cases, the one or more vehicular sensors tracking operational conditions of the vehicle might include, but are not limited to, at least one of one or more engine speed sensors, one or more engine air flow sensors, one or more air-fuel mixture sensors, one or more vehicle speed sensors, one or more brake actuator sensors, one or more vehicle traction sensors, one or more vehicle stability sensors, one or more vehicle body motion sensors, and/or the like. The one or more operator input sensors tracking operator input by the operator of the vehicle might include, without limitation, at least one of one or more accelerator pedal position sensors, one or more cruise control switch sensors, one or more brake pedal position sensors, one or more steering angle sensors, and/or the like.

At block 520, method 500 might comprise analyzing, with the portable device (and/or with at least one remote computing system, such as remote server 175 in FIGS. 1 and 2, or the like), at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised. In some cases, analyzing the combination of the monitored one or more vehicle sensor data and the monitored one or more operator input sensor data might comprise analyzing, with the portable device (and/or with the at least one remote computing system), the one or more vehicle sensor data and the one or more operator input sensor data to determine whether the one or more vehicle sensor data indicates operational conditions of the vehicle that are inconsistent with the corresponding one or more operator input sensor data (block 525).

Method 500, in some embodiments, might comprise encrypting, with the portable device (and/or with the at least one remote computing system), the monitored one or more vehicle sensor data and the monitored one or more operator input sensor data (block 530) and storing, with the portable device, the encrypted one or more vehicle sensor data and the encrypted one or more operator input sensor data in a local data storage device of the portable device (block 535) or storing, with the at least one remote computing system, the encrypted one or more vehicle sensor data and the encrypted one or more operator input sensor data in a remote data store (such as data lake 180 of FIG. 1, or the like). In some cases, encrypting the monitored one or more vehicle sensor data and the monitored one or more operator input sensor data might include using one or more cryptographic protocols or techniques comprising AES symmetric-key algorithm, Diffie-Hellman key exchange, SHA-1 hash function, forward secrecy, deniable authentication, or malleable encryption, and/or the like. Although FIG. 5A depicts the encryption and storing operations (of block 530 and 535) as being performed after the analysis operation (of blocks 520 and 525), the various embodiments are not so limited, and encrypting and storing the monitored one or more vehicle sensor data and the monitored one or more operator input sensor data can be performed either before or after analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised. The latter is as shown in FIG. 5A, while the former requires retrieval and decryption of the at least one of the monitored wireless communications between the at least one vehicle computing system and the at least one device external to the vehicle or the combination of the monitored one or more vehicle sensor data and the monitored one or more operator input sensor data prior to analysis.

At block 540, method 500 might comprise, based on a determination that vehicle operation has been compromised, alerting the operator of the vehicle regarding the vehicle operation being compromised, using the portable device via a user interface. According to some embodiments, the user interface might be embodied within (or on an exterior surface) of the portable device (such as the buttons 225 and 230, the display devices 235, or the other input/output devices 240 of system 200 of FIG. 2, or the like), might be embodied within a user interface device that is part of the vehicle (e.g., a dash-mounted display device, a speaker system of the vehicle, the instrument cluster, a heads-up display, and/or the like), and/or might be embodied within at least one user device (including, but not limited to, a laptop computer, a tablet computer, a smart phone, a mobile phone, a portable gaming device, and/or the like) that is associated with the operator (or a passenger of) the vehicle (see, e.g., the embodiment of FIG. 7 or the like), and/or the like. Method 500, at block 545 might further comprise initiating, with the portable device, one or more remediation operations (embodiments of which are shown and described with respect to FIG. 5B).

In FIG. 5B, for the embodiments corresponding to the processes at blocks 550 and 555, the vehicle might be an Internet of Things ("IoT")-capable vehicle and the at least one device external to the vehicle might comprise at least one IoT-capable device. The wireless communications between the at least one vehicle computing system and the at least one device external to the vehicle might comprise machine-to-machine IoT communications. For the embodiments corresponding to the processes at blocks 560 and 565, the wireless communications might be either machine-to-machine IoT communications or other (non-IoT) types of wireless communications, or the like With reference to FIG. 5B, initiating the one or more remediation operations (at block 545) might comprise, at block 550, disrupting, with the portable device, communication between the at least one vehicle computing system and the at least one device external to the vehicle, based on a determination that vehicle operation has been compromised by the at least one device external to the vehicle via the machine-to-machine IoT communications (in cases in which the portable device is an IoT gateway through which all IoT communications pass) and based on the operator action comprising disconnecting the portable device from the OBD2 DLC port. In other words, when the user disconnects the portable device from the OBD2 DLC port, because it had become the point or gateway through which all IoT communications pass, the portable device physically disrupts the communication between the at least one vehicle computing system and the at least one device external to the vehicle. The process might proceed to block 595 in FIG. 5D, following the circular marker denoted, "B," at which method 500 might further comprise, in response to the operator reconnecting the portable device into the OBD2 DLC port, establishing, with the portable device, communication between the at least one vehicle computing system and one or more telematics sources (block 595).

Turning back to FIG. 5B, initiating the one or more remediation operations (at block 545) might comprise, at block 555, disrupting, with the portable device, communication between the at least one vehicle computing system and the at least one device external to the vehicle, based on a determination that vehicle operation has been compromised by the at least one device external to the vehicle via the machine-to-machine IoT communications (in cases in which the portable device is an IoT gateway through which all IoT communications pass) and based on the operator action comprising depressing the block-wireless-communications button on the portable device (which might correspond to the block-wireless-communications button 225 of FIG. 2, or the like). In other words, when the user presses (or depresses) the block-wireless-communications button on the portable device, because it had become the point or gateway through which all IoT communications pass, the portable device logically (or physically via an internal physical switch) disrupts the communication between the at least one vehicle computing system and the at least one device external to the vehicle.

Alternatively, either in cases in which the portable device is an IoT gateway through which all IoT communications pass or in cases in which other wireless devices have access to the vehicle computing systems (and/or other vehicle systems) (i.e., where wireless communications can bypass the portable device), initiating the one or more remediation operations (at block 545) might comprise, at block 555, disrupting, with the portable device, communication between the at least one vehicle computing system and the at least one device external to the vehicle by jamming all wireless communications within at least one set of telecommunications frequency ranges to and from the vehicle, based on a determination that vehicle operation has been compromised by the at least one device external to the vehicle via the wireless communications and based on the operator action comprising depressing the block-wireless-communications button on the portable device. In some cases, the portable device might selectively jam only certain ranges of wireless communications frequencies within the vehicle (or within a short distance from the portable device, e.g., distance sufficient to jam any wireless device on any portion of the vehicle from front to rear bumper, from roof to undercarriage (and tire), without significantly or unreasonable jamming wireless communications for other vehicles or nearby buildings, or the like). Alternatively, the portable device might jam all wireless communications frequencies within the vehicle (or within a short distance from the portable device, as described above). Where all wireless communications frequencies (or at least the frequencies associated with telematics sources) have been disrupted, jammed, or otherwise blocked, the vehicle would still function but would operate without telematics data to support operation (i.e., the vehicle would revert to substantially or effectively "manual" operation, with only the on-board operational systems that can function within externally sourced telematics being operational to aid the operator in the operation of the vehicle).

According to some embodiments, alternative or in addition to the processes at blocks 550-560, initiating the one or more remediation operations (at block 545) might comprise, at block 565, restoring, with the portable device, settings and configurations for at least one of the one or more computing systems of the vehicle, the one or more vehicular sensors, or the one or more operator input sensors, based on a determination that vehicle operation has been compromised by the at least one device external to the vehicle via the wireless communications and based on the operator action comprising depressing the restore button on the portable device (which might correspond to the restore button 230 of FIG. 2, or the like). The settings and configurations for the at least one of the one or more computing systems of the vehicle, the one or more vehicular sensors, or the one or more operator input sensors might comprise one of factory settings and configurations or previously saved settings and configurations, and/or the like. In other words, when the user presses (or depresses) the restore button on the portable device, the portable device restores the settings and configurations for the computing systems and/or the sensors to a previous set of settings and configurations. This ensures that any viruses, intrusion attempts, or other malicious software ("malware") or the like that have infected the computing systems and/or the sensors via the wireless communications can be eliminated by restoration to a restoration point or the like. Any changed settings and configurations due to intrusion attempts by hackers or the like may also be reset by restoration to a restoration point or the like. FIG. 5C illustrates the processes for detecting, blocking, and removing any viruses, intrusion attempts, or other malware, or the like (which includes those viruses, intrusion attempts, or other malware, or the like that cannot be eliminated by restoration, etc.).

Turning back to the process at block 545 in FIG. 5A, method 500 proceeds to block 570 in FIG. 5C, following the circular marker denoted, "A." With reference to block 570 in FIG. 5C (following circular marker, "A" in FIG. 5A), method 500 might comprise detecting, with the portable device, whether the wireless communications comprises at least one of one or more viruses, one or more electronic intrusion attempts, or one or more other malicious software. The process at block 570 might, in some cases, be part of the process of analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised (at block 520). Based on detection of at least one of one or more viruses, one or more electronic intrusion attempts, or one or more other malicious software in the wireless communications, method 500 might further comprise, at block 575, blocking, with the portable device, the at least one of one or more viruses, one or more electronic intrusion attempts, or one or more other malicious software from infecting the at least one vehicle computing system via the wireless communications.

Method 500 might further comprise detecting, with the portable device, whether at least one of the one or more computing systems of the vehicle, the one or more vehicular sensors, or the one or more operator input sensors comprises at least one of one or more viruses, one or more electronic intrusion attempts, or one or more other malicious software (block 580), and (based on detection of at least one of one or more viruses, one or more electronic intrusion attempts, or one or more other malicious software in at least one of the one or more computing systems of the vehicle, the one or more vehicular sensors, or the one or more operator input sensors) removing, with the portable device, the at least one of one or more viruses, one or more electronic intrusion attempts, or one or more other malicious software from the at least one of the one or more computing systems of the vehicle, the one or more vehicular sensors, or the one or more operator input sensors (block 585).

In some cases, method 500 might comprise, at block 590, validating, with the portable device, firmware of at least one of the one or more computing systems of the vehicle, the one or more vehicular sensors, or the one or more operator input sensors.

Exemplary System and Hardware Implementation

Figure 6:
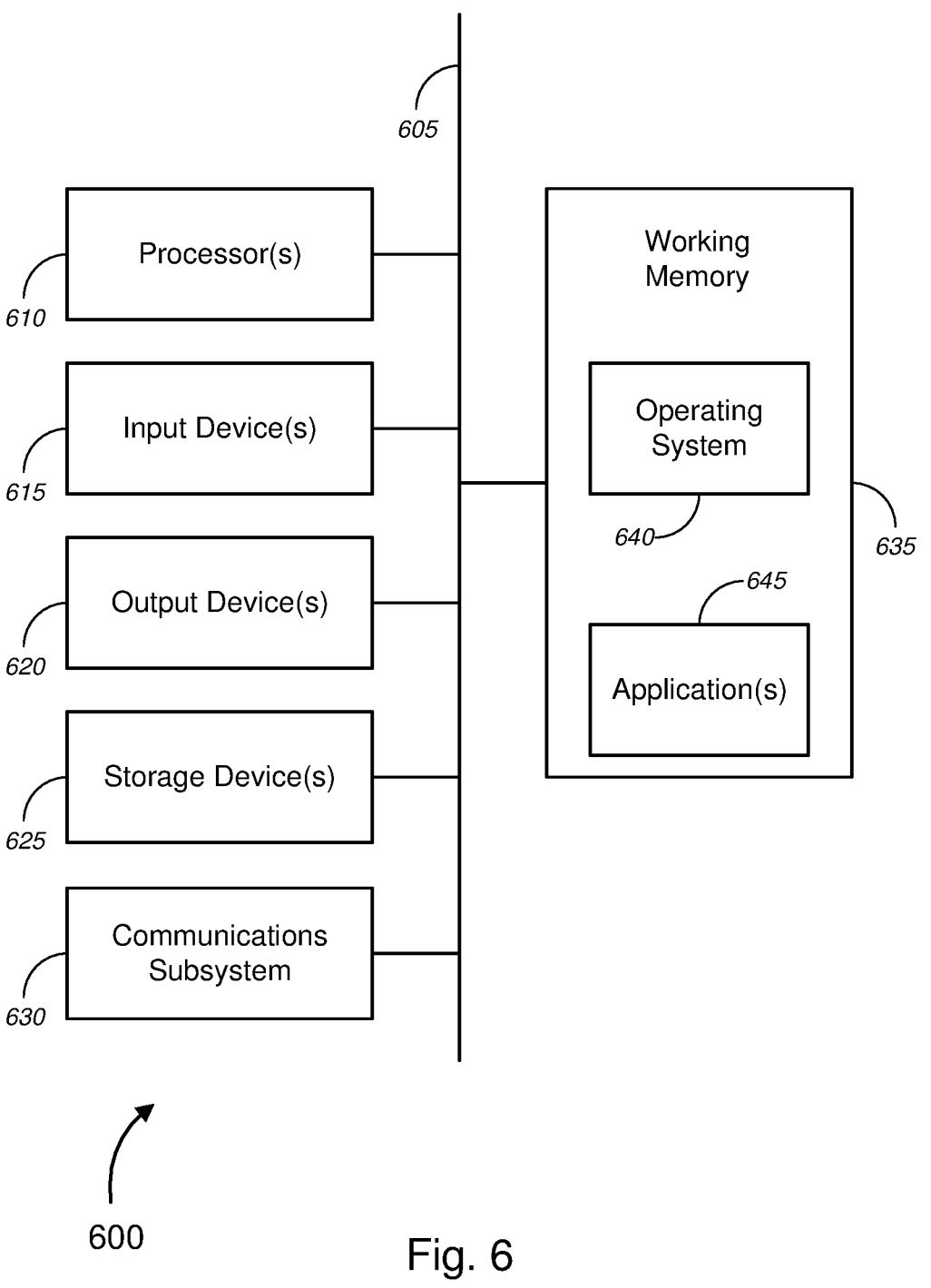
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., portable devices 105 and 410, vehicle systems 250 (including, but not limited to, vehicle computing systems 125, 305a-305h, and 415a-415h, vehicular sensors 130, 310a-310m, and 420a-420m, vehicle operational systems 135, 315a-315h, and 425a-425h, etc.), third party devices 150, and remote server 175, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner. The computer or hardware system 600—which might represent an embodiment of the computer or hardware system (i.e., portable devices 105 and 410, vehicle systems 250 (including, but not limited to, vehicle computing systems 125, 305a-305h, and 415a-415h, vehicular sensors 130, 310a-310m, and 420a-420m, vehicle operational systems 135, 315a-315h, and 425a-425h, etc.), third party devices 150, and remote server 175, etc.), described above with respect to FIGS. 1-4—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, sensors, and/or the like; and one or more output devices 620, which can include, without limitation, a display device, a printer, indicator lights, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system

640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

As noted above, a set of embodiments comprises methods and systems for implementing Internet of Things ("IoT") functionality, and, in particular embodiments, to methods, systems, apparatus, and computer software for implementing added services for OBD2 connection for IoT-capable vehicles. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, smart phone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to networks 160 and 170 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing IoT functionality, and, in particular embodiments, to methods, systems, apparatus, and computer software for implementing added services for OBD2 connection for IoT-capable vehicles, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a portable device 725 (which might correspond to portable devices 105 and 410 of FIGS. 1, 2, and 4, or the like) and an on-board diagnostics ("OBD2") data link connector ("DLC") port 730 (which might correspond to OBD2 DLC port 115 and 405 of FIGS. 1-4, or the like) disposed with vehicle 735 (which might correspond to vehicle 110 of FIGS. 1-4, or the like). The portable device 725 might comprise a corresponding OBD2 DLC 740 (which might correspond to OBD2 DLC 120 and 215 of FIGS. 1 and 2, or the like) that is configured to removably attach or connect with the OBD2 DLC port 730. System 700 might further comprise one or more vehicle computing systems 745 (which might correspond to vehicle computing systems 125, 305*a*-305*h*, and 415*a*-415*h* of FIGS. 1, 3, and 4, or the like), one or more vehicular sensors 750 (which might correspond to portable devices 105 and 410 of FIGS. 1, 2, and 4, or the like), one or more vehicle operational systems 755 (which might correspond to vehicular sensors 130, 310*a*-310*m*, and 420*a*-420*m* of FIGS. 1, 3, and 4, or the like) (collectively, "vehicle systems," which might correspond to vehicle systems 250 of FIG. 2, or the like), and (optionally) a wireless transceiver 760 (which might correspond to vehicle operational systems 135, 315*a*-315*h*, and 425*a*-425*h* of FIGS. 1, 3, and 4, or the like).

In some embodiments, the one or more vehicle computing systems 745 of the vehicle 735 might include, without limitation, at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), a vehicular computing node, or other computing systems, and/or the like. The one or more vehicular sensors, in some instances, might include, but is not limited to, at least one of one or more accelerator pedal position sensors, one or more engine speed sensors, one or more engine air flow sensors, one or more air-fuel mixture sensors, one or more vehicle speed sensors, one or more cruise control switch sensors, one or more brake pedal position sensors, one or more brake actuator sensors, one or more vehicle traction sensors, one or more vehicle stability sensors, one or more vehicle body motion sensors, one or more steering angle sensors, or other sensors, and/or the like. In some cases, the one or more vehicle operational systems 755 might include, without limitation, at least one of an accelerator pedal, an engine, a throttle valve, a steering wheel, one or more brakes, a brake pedal, or other operational systems, and/or the like.

In some cases, system 700 might further comprise one or more third party devices 765 (which might correspond to third party devices 150 of FIGS. 1 and 2, or the like), which might have a corresponding set of databased 770 (which might correspond to databases 155 of FIGS. 1 and 2, or the like).

In operation, the portable device 725 (when connected to, or plugged into, the OBD2 DLC port 730) might monitor wireless communications between at least one vehicle computing system of the one or more vehicle computing systems 745 (or the vehicle systems collectively) and at least one third party device 765 (or other device external to the vehicle 735). The portable device 725 (when connected to, or plugged into, the OBD2 DLC port 730) might also monitor one or more vehicle sensor data from one or more vehicular sensors 750 (e.g., at least one of one or more engine speed sensors, one or more engine air flow sensors, one or more air-fuel mixture sensors, one or more vehicle speed sensors, one or more brake actuator sensors, one or more vehicle traction sensors, one or more vehicle stability sensors, one or more vehicle body motion sensors, and/or the like) tracking operational conditions of the vehicle (i.e., conditions of the one or more vehicle operational systems 755 or the like) and might also monitor one or more operator input sensor data from one or more operator input sensors 750 (e.g., at least one of one or more accelerator pedal position sensors, one or more cruise control switch sensors, one or more brake pedal position sensors, one or more steering angle sensors, and/or the like) tracking operator input by an operator of the vehicle 735.

In some embodiments, the portable device 725 (while in other embodiments, at least one of the servers 715*a* or 715*b* (which might correspond to remote server 175 in FIGS. 1 and 2, or the like)) might analyze at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised. Based on a determination that vehicle operation has been compromised, the portable device 725 (or the at least one of the servers 715*a* or 715*b*, or the like) might alert the operator of the vehicle regarding the vehicle operation being compromised, using the portable device via a user interface (in some cases, via at least one of user devices 705*a* or 705*b*, or the like). The portable device 725 (or the at least one of the servers 715*a* or 715*b*, or the like) might subsequently initiate one or more remediation operations (such as the remediation operations as shown and described above with respect to FIG. 5, or the like). These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

monitoring, with a portable device in communication with one or more computing systems of a vehicle via an on-board diagnostics ("OBD2") data link connector ("DLC") port, wireless communications between at least one vehicle computing system of the one or more computing systems of the vehicle and at least one device external to the vehicle;

monitoring, with the portable device via the OBD2 DLC port, one or more vehicle sensor data from one or more vehicular sensors tracking operational conditions of the vehicle;

monitoring, with the portable device via the OBD2 DLC port, one or more operator input sensor data from one or more operator input sensors tracking operator input by an operator of the vehicle;

analyzing, with the portable device, at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised;

based on a determination that vehicle operation has been compromised, alerting the operator of the vehicle regarding the vehicle operation being compromised, using the portable device via a user interface; and initiating, with the portable device, one or more remediation operations, wherein analyzing the combination of the monitored one or more vehicle sensor data and the monitored one or more operator input sensor data comprises analyzing, with the portable device, the one or more vehicle sensor data and the one or more operator input sensor data to determine whether the one or more vehicle sensor data indicates operational conditions of the vehicle that are inconsistent with the corresponding one or more operator input sensor data.

2. The method of claim 1, wherein the one or more computing systems of the vehicle comprise at least one of an electronic control unit ("ECU"), an electronic control module ("ECM"), an electronic throttle control ("ETC") system, an electronic stability control ("ESC") system, a variable-assist power steering system, an automatic steering system, an anti-lock braking system ("ABS"), or a vehicular computing node.

3. The method of claim 1, wherein the one or more vehicular sensors comprise at least one of one or more accelerator pedal position sensors, one or more engine speed sensors, one or more engine air flow sensors, one or more air-fuel mixture sensors, one or more vehicle speed sensors, one or more cruise control switch sensors, one or more brake pedal position sensors, one or more brake actuator sensors, one or more vehicle traction sensors, one or more vehicle stability sensors, one or more vehicle body motion sensors, or one or more steering angle sensors.

4. The method of claim 1, wherein the vehicle is an Internet of Things ("IoT")-capable vehicle and the at least one device external to the vehicle comprises at least one IoT-capable device, wherein the wireless communications between the at least one vehicle computing system and the at least one device external to the vehicle comprises machine-to-machine IoT communications.

5. The method of claim 4, wherein the portable device is an IoT gateway through which all IoT communications pass, wherein initiating the one or more remediation operations comprises, based on a determination that vehicle operation has been compromised by the at least one device external to the vehicle via the machine-to-machine IoT communications and based on the operator action comprising disconnecting the portable device from the OBD2 DLC port, disrupting, with the portable device, communication between the at least one vehicle computing system and the at least one device external to the vehicle.

6. The method of claim 5, further comprising:

in response to the operator reconnecting the portable device into the OBD2 DLC port, establishing, with the portable device, communication between the at least one vehicle computing system and one or more telematics sources.

7. The method of claim 4, wherein the portable device is an IoT gateway through which all IoT communications pass, wherein the portable device comprises a block-wireless-communications button, wherein initiating the one or more remediation operations comprises, based on a determination that vehicle operation has been compromised by the at least one device external to the vehicle via the machine-to-machine IoT communications and based on the operator action comprising depressing the block-wireless-communications button on the portable device, disrupting, with the portable device, communication between the at least one vehicle computing system and the at least one device external to the vehicle.

8. The method of claim 1, wherein the portable device comprises a restore button, wherein initiating the one or more remediation operations comprises, based on a determination that vehicle operation has been compromised by the at least one device external to the vehicle via the wireless communications and based on the operator action comprising depressing the restore button on the portable device, restoring, with the portable device, settings and configurations for at least one of the one or more computing systems of the vehicle, the one or more vehicular sensors, or the one or more operator input sensors, wherein the settings and configurations for the at least one of the one or more computing systems of the vehicle, the one or more vehicular sensors, or the one or more operator input sensors comprise one of factory settings and configurations or previously saved settings and configurations.

9. The method of claim 1, further comprising:

encrypting, with the portable device, the monitored one or more vehicle sensor data and the monitored one or more operator input sensor data; and storing, with the portable device, the encrypted one or more vehicle sensor data and the encrypted one or more operator input sensor data in a local data storage device of the portable device;

wherein encrypting and storing the monitored one or more vehicle sensor data and the monitored one or more operator input sensor data are performed either before or after analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised.

10. The method of claim 9, wherein encrypting the monitored one or more vehicle sensor data and the monitored one or more operator input sensor data comprises encrypting, with the portable device, the monitored one or more vehicle sensor data and the monitored one or more operator input sensor data, using one or more cryptographic protocols or techniques comprising AES symmetric-key algorithm, Diffie-Hellman key exchange, SHA-1 hash function, forward secrecy, deniable authentication, or malleable encryption.

11. The method of claim 1, wherein analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised comprises detecting, with the portable device, whether the wireless communications comprises at least one of one or more viruses, one or more electronic intrusion attempts, or one or more other malicious software and blocking, with the portable device, the at least one of one or more viruses, one or more electronic intrusion attempts, or one or more other malicious software from infecting the at least one vehicle computing system via the wireless communications.

12. The method of claim 1, further comprising:

detecting, with the portable device, whether at least one of the one or more computing systems of the vehicle, the one or more vehicular sensors, or the one or more operator input sensors comprises at least one of one or more viruses, one or more electronic intrusion attempts, or one or more other malicious software; and removing, with the portable device, the at least one of one or more viruses, one or more electronic intrusion attempts, or one or more other malicious software from the at least one of the one or more computing systems of the vehicle, the one or more vehicular sensors, or the one or more operator input sensors.

13. The method of claim 1, further comprising:

validating, with the portable device, firmware of at least one of the one or more computing systems of the vehicle, the one or more vehicular sensors, or the one or more operator input sensors.

14. A portable device, comprising:

an on-board diagnostics ("OBD2") data link connector ("DLC") in communication with one or more computing systems of a vehicle via an OBD2 DLC port of the vehicle;

at least one processor;

a data storage device; and a non-transitory computer readable medium communicatively coupled to the at least one processor, the non-transitory computer readable medium having stored thereon computer software comprising a set of instructions that, when executed by the at least one processor, causes the portable device to:

monitor, via the OBD2 DLC port, wireless communications between at least one vehicle computing system of the one or more computing systems of the vehicle and at least one device external to the vehicle;

monitor, via the OBD2 DLC port, one or more vehicle sensor data from one or more vehicular sensors tracking operational conditions of the vehicle;

monitor, via the OBD2 DLC port, one or more operator input sensor data from one or more operator input sensors tracking operator input by an operator of the vehicle;

analyze at least one of the monitored wireless communications between the at least one vehicle computing system and the at least one device external to the vehicle or a combination of the monitored one or more vehicle sensor data and the monitored one or more operator input sensor data, to determine whether vehicle operation has been compromised;

based on a determination that vehicle operation has been compromised, alert the operator of the vehicle regarding the vehicle operation being compromised; and initiate one or more remediation operations, wherein analyzing the combination of the monitored one or more vehicle sensor data and the monitored one or more operator input sensor data comprises analyzing, with the portable device, the one or more vehicle sensor data and the one or more operator input sensor data to determine whether the one or more vehicle sensor data indicates operational conditions of the vehicle that are inconsistent with the corresponding one or more operator input sensor data.

15. The portable device of claim 14, further comprising:

a restore button;

wherein initiating the one or more remediation operations comprises, based on a determination that vehicle operation has been compromised by the at least one device external to the vehicle via the wireless communications and based on the operator action comprising depressing the restore button on the portable device, restoring settings and configurations for at least one of the one or more computing systems of the vehicle, the one or more vehicular sensors, or the one or more operator input sensors, wherein the settings and configurations for the at least one of the one or more computing systems of the vehicle, the one or more vehicular sensors, or the one or more operator input sensors comprise one of factory settings and configurations or previously saved settings and configurations.

16. The portable device of claim 14, wherein the set of instructions, when executed by the at least one processor, further causes the portable device to:

encrypt the monitored one or more vehicle sensor data and the monitored one or more operator input sensor data; and store the encrypted one or more vehicle sensor data and the encrypted one or more operator input sensor data in the data storage device of the portable device;

wherein encrypting and storing the monitored one or more vehicle sensor data and the monitored one or more operator input sensor data are performed either before or after analyzing the at least one of the monitored wireless communications between the at least one vehicle computing system and the at least one device external to the vehicle or the combination of the monitored one or more vehicle sensor data and the monitored one or more operator input sensor data, to determine whether vehicle operation has been compromised.

* * * * *